United States Patent
Gong et al.

(10) Patent No.: US 7,177,814 B2
(45) Date of Patent: Feb. 13, 2007

(54) DYNAMIC GRAMMAR FOR VOICE-ENABLED APPLICATIONS

(75) Inventors: Li Gong, San Francisco, CA (US); Jie Weng, Sunnyvale, CA (US); Samir Raiyani, Sunnyvale, CA (US); Richard J. Swan, Portola Valley, CA (US); Hartmut K. Vogler, Foster City, CA (US)

(73) Assignee: SAP Aktiengesellschaft, Walldorf (DE)

( * ) Notice: Subject to any disclaimer, the term of this patent is extended or adjusted under 35 U.S.C. 154(b) by 872 days.

(21) Appl. No.: 10/305,267

(22) Filed: Nov. 27, 2002

(65) Prior Publication Data

US 2004/0006474 A1   Jan. 8, 2004

Related U.S. Application Data

(63) Continuation-in-part of application No. 10/184,069, filed on Jun. 28, 2002, and a continuation-in-part of application No. 10/157,030, filed on May 30, 2002, and a continuation-in-part of application No. 10/131,216, filed on Apr. 25, 2002.

(60) Provisional application No. 60/383,775, filed on May 30, 2002, provisional application No. 60/354,324, filed on Feb. 7, 2002.

(51) Int. Cl.
*G10L 21/06* (2006.01)
*G10L 15/26* (2006.01)
*G06F 17/20* (2006.01)

(52) U.S. Cl. .................... 704/270.1; 704/231; 704/275

(58) Field of Classification Search .................... None
See application file for complete search history.

(56) References Cited

U.S. PATENT DOCUMENTS 5,734,910 A   3/1998  Corrigan et al.
5,945,989 A   8/1999  Freishtat et al.

(Continued)

FOREIGN PATENT DOCUMENTS

WO   WO 96/13030 A   5/1996

(Continued)

OTHER PUBLICATIONS

Balentine et al. "How to Build a Speech Recognition Application," 2001, Enterprise Integration Group, Inc. pp. 12, 13.*

(Continued)

*Primary Examiner*—V. Paul Harper
(74) *Attorney, Agent, or Firm*—Fish & Richardson P.C.

(57) ABSTRACT

A graphical user interface may include a form with a plurality of fields, each field associated with a predetermined category. Each category may have its own, independent, discrete grammar associated therewith, and the independent grammars may be individually activated, simultaneously with their respective categories. In this way, a voice-recognition system that is inputting spoken data for each of the fields may have a restricted grammar to search when attempting to match a particular voice input with an entry for a particular field in the form. Moreover, a global grammar that is active with any one of the independent grammars may be used to move between the fields or perform other high-level functionality not associated with any one of the independent grammars.

31 Claims, 26 Drawing Sheets

U.S. PATENT DOCUMENTS

| | | | |
|---|---|---|---|
| 6,012,030 | A | 1/2000 | French-St. George et al. |
| 6,119,147 | A | 9/2000 | Toomey et al. |
| 6,173,266 | B1 | 1/2001 | Marx et al. |
| 6,330,539 | B1 | 12/2001 | Takayama et al. |
| 6,363,393 | B1 | 3/2002 | Ribitzky |
| 6,377,913 | B1 | 4/2002 | Coffman et al. |
| 6,453,281 | B1 * | 9/2002 | Walters et al. ............... 704/200 |
| 6,456,972 | B1 * | 9/2002 | Gladstein et al. ........... 704/257 |
| 6,501,832 | B1 | 12/2002 | Saylor et al. |
| 6,513,063 | B1 | 1/2003 | Julia et al. |
| 6,523,061 | B1 | 2/2003 | Halverson et al. |
| 6,587,820 | B2 * | 7/2003 | Kosaka et al. ............... 704/257 |
| 2001/0049603 | A1 | 12/2001 | Sravanapudi et al. |
| 2003/0140113 | A1 * | 7/2003 | Balasuriya .................. 709/217 |

FOREIGN PATENT DOCUMENTS

| | | |
|---|---|---|
| WO | WO 97/28634 A | 8/1997 |
| WO | WO 01/69449 A | 9/2001 |
| WO | WO 01/93250 A | 12/2001 |

OTHER PUBLICATIONS

ScanSoft, Inc., Product Listings and Descriptions for Dragon Naturally Speaking and PDsay, 2002, printed from http://www.scansoft.com/ (8 pages).

Hewlett-Packard Company, Cascaded Support Pages, 2002, printed from http://welcome.hp.com/ and linked pages (5 pages).

Hewlett-Packard Company, Customizing an Order with Pull-Down Menus, 2002, printed from http://www.hp.com and linked pages (3 pages).

Amazon.com, Inc., Search Menu for Books, 2002, printed from http://www.amazon.com (2 pages).

Dell Computer Corporation, "Dell Express Path II, Computer Finder," 2002, printed from http://www.dell.com and linked pages (2 pages).

Compaq, "Customize Your Configuration," 2002, printed from http://athome.compaq.com/ and linked pages ( 5 pages).

Andrew Hunt (editor), "JSpeech Grammer Format," Jun. 2000, printed from http://www.w3.org/TR/2000/NOTE-jsgf-20000605 (31 pages).

Michael Riben, M.D, Speech Recognition Tutorial, Jan. 1999, printed from http://home.nycap.rr.com/voice (50 pages).

Michael Classen, "The .Voice of XML," Jun. 2001, printed from http://www.webreference.com (13 pages).

Just van den Broecke, "Pushlets: Send events from servlets to DHTML client browsers," Mar. 2000, printed from http://www.JavaWorld.com (15 pages).

Nuance Communications Inc., "Nuance 8.0 Delivers Lower Costs for Enterprises and Service Providers, Boosts Customer Satisfaction with Superior Accuracy and Personalized Caller Interactions," Jan. 2002, printed from http://www.nuance.com (4 pages).

Nuance Communications Inc., "Nuance Backs W3C for Multi-Modal Applications Standard Setting," Feb. 2002, printed from http://www.nuance.com (2 pages).

Speech Application Language Tags ("SALT") Forum, "Cisco, Comverse, Intel, Microsoft, Philips and SpeechWorks Found Speech Application Language Tags Forum to Develop New Standard For Multimodal and Telephony-Enabled Applications and Services," Oct. 2001, printed from http://www.saltforum.org (5 pages).

Speech Application Language Tags ("SALT") Forum, "The SALT Forum Welcomes Additional Technology Leaders as Contributors," Jan. 2002, printed from http://www.saltforum.org (4 pages).

Speech Applications Language Tags ("SALT") Forum, "Speech Application Language Tags (SALT) Technical White Paper," printed from http://www.saltforum.org/downloads (6 pages).

Jonathan Eisenzopf, "Microsoft-led SALT Forum Releases Draft Spec," 2002, printed from http://voicexmlplanet.com/articles/saltspec.html (4 pages).

Jupitermedia Corporation, "KnowNow Debuts with Event Routing Technology," Jun. 2001, printed from http://siliconvalley.internet.com/news/print.php/793671 (2 pages).

KnowNow, Inc., "Library Listing," 2002, printed from htt/://www.knownow.com (1 page).

KnowNow, Inc., "Event Routing vs. Multicasting: Marrying Publish-Subscribe and Internet-Style Routing," 2002, printed from htt/://www.knownow.com (3 pages).

KnowNow, Inc., "Web-Standard Messaging: Using Message Routing for Fast, Simple and Affordable Integration," 2002, printed from htt/://www.knownow.com (4 pages).

KnowNow, Inc., "KnowNow Architecture Overview," 2002, printed from htt/://www.knownow.com (5 pages).

Paaso et al., "A New Environment for Courseware Development, Course Delivery and Training", Proceedings of the ED-Media 97.

Henze et al., "Modeling Constructivist Teaching Functionality and Structure in the KBS Hyperbook System", Jun. 1999.

Jungmann et al., Adaptive Hypertext in Complex Information Spaces, Mar. 1997.

Jin et al., "An Ontology-Aware Authoring Tool-Functional Structure and Guidance Generation".

Siekmann et al., "Adaptive Course Generation and Presentation".

Albert et al., "Adaptive and Dynamic Hypertext Tutoring Systems Based on Knowledge Space Theory".

Ranwez et al., "Description and Construction of Pedagogical Material Using an Ontology Based DTD".

Max Muhlhauser, "Cooperative Computer-Aided Authoring and Learning" 1995, Kluwer Academic Publishers.

* cited by examiner

DYNAMIC GRAMMAR FOR VOICE-ENABLED APPLICATIONS

CROSS-REFERENCE TO RELATED APPLICATIONS

This application claims priority from (i) U.S. Provisional Application No. 60/383,775, filed May 30, 2002, and titled DYNAMIC GRAMMAR WITH VISUAL CUES FOR VOICE-ENABLED MOBILE APPLICATIONS and from (ii) U.S. Provisional Application No. 60/354,324, filed Feb. 7, 2002, and titled MOBILE APPLICATION ARCHITECTURE, and is a Continuation-in-Part of (iii) U.S. application Ser. No. 10/131,216, filed April 25, 2002, titled MULTI-MODAL SYNCHRONIZATION, (iv) U.S. application Ser. No. 10/157,030, filed May 30, 2002, titled USER INTERFACE FOR DATA ACCESS AND ENTRY, and (v) U.S. application Ser. No. 10/184,069, filed Jun. 28, 2002, titled USER INTERFACE FOR DATA ACCESS AND ENTRY, all five of which are hereby incorporated by reference in their entirety for all purposes.

TECHNICAL FIELD

Particular implementations relate generally to voice recognition techniques, and more particularly to using dynamic grammars with visual cues for voice-enabled mobile applications.

BACKGROUND

Conventional systems exist for the recognition of voice commands and other voice inputs. Such systems, however, may be relatively slow and/or inaccurate in inputting data, particularly when processing and/or memory limitations exist, as may be the case with mobile applications. In some data-input situations, voice commands can be avoided by using a physical input, such as a keyboard or stylus. However, in more text-intensive data entry, such physical inputs, particularly in the context of mobile applications, may be overly awkward or time-consuming.

SUMMARY

Implementations provide techniques for allowing fast, accurate inputting and recognition of voice data, even in mobile applications. Moreover, disclosed techniques allow a user to select between voice and physical inputs, as desired by the user. Implementations include a plurality of independent grammars, each associated with a category, such as a field within a form on a graphical user interface. The grammars may be dynamically activated or deactivated, depending upon which category or field is currently inputting data from the user. The currently active grammar may be indicated to the user by way of a visual cue associated with the, for example, field displayed on the graphical user interface. Thus, at a given point of time, only the selected field is active for data entry and subsequent display of the result of voice recognition, and a visual cue is used to indicate the active field. Also, a global grammar for inputting commands related to all of the categories, and/or to the device or application implementing the graphical user interface, may be kept active simultaneously with any one of the independent, category-associated grammars.

According to one general aspect, an implementation may include a first grammar activated from among a plurality of independent grammars, the first grammar being identified with a first input category. At least a second grammar from among the plurality of independent grammars is deactivated, spoken data related to the first input category is input, and the spoken data is matched to stored data within the first grammar.

Implementations may include one or more of the following features. For example, the plurality of independent grammars may define a first level of grammar, and, in activating the first grammar, a second level of grammar independent from the plurality of independent grammars may be activated. In this case, in deactivating the second grammar, all of the first-level grammars aside from the first grammar may be deactivated.

A first-modality gateway and a second modality gateway may be synchronized, where both gateways may interface between a user and a server system. The synchronizing may allow either of the first-modality gateway or the second-modality gateway, at a given point in time, to interface with specific information in the server system. In this case, the specific information may be a field identification command for identifying a first field within a form on a graphical user interface, where the first field may be associated with the first input category. The specific information may be the stored data.

Also, in synchronizing the first-modality gateway and the second-modality gateway, a browser and a voice gateway may also be synchronized, wherein the server system includes web pages. In this case, the first grammar may be activated in response to the first field being identified within the form.

Each of the plurality of independent grammars may be stored separately.

In activating the first grammar, it may be indicated to a user, perhaps aurally, that the first grammar has been activated. In this case, in indicating to the user that the first grammar has been activate, a visual cue identifying a first field within a graphical user interface, such as a web page, may be displayed, the first field being associated with the first input category. Also, the visual cue may be automatically advanced to a second field upon the matching of the spoken data to the stored data within the first grammar. Alternatively, the visual cue may be advanced to a second field, after the matching of the spoken data to the stored data within the first grammar, by inputting a field advancement voice command, wherein the field advancement voice command may be matched against a global grammar that is active at a same time as the first grammar.

Additionally, the first grammar may be deactivated, and the second grammar may then be activated. The second grammar may be identified with a second input category. Secondary spoken data related to the second input category may be input, and the secondary spoken data may be matched to secondary stored data within the second grammar.

Also, a global grammar may be activated such that the first grammar and the global grammar are both active for a period of time, global spoken data may be input that identifies a second input category from among a plurality of input categories, the global spoken data may be matched to a portion of the global grammar, and activating the second grammar in response to the matching of the global spoken data, where the second grammar may be identified with the second input category.

According to another general aspect, an apparatus comprises a storage medium having instructions stored thereon, and the instructions include a first code segment for activating a first grammar associated with a first category, a second code segment for activating a first data entry mechanism associated with the first category, a third code segment for receiving first voice data, a fourth codes segment for selecting a portion of the first grammar corresponding to the first voice data for input into the first data entry mechanism, a fifth code segment for deactivating the first grammar, a sixth code segment for activating a second grammar associated with a second category, a seventh code segment for activating a second data entry mechanism associated with the second category, an eighth code segment for receiving second voice data, and a ninth code segment for selecting a portion of the second grammar corresponding to the second voice data for input into the second data entry mechanism.

Implementations may include one or more of the following features. For example, the first data entry mechanism may be a field in a graphical user interface, such as a web page, in which case the second code segment may be additionally for visually indicating the field.

The first data entry mechanism may be an audio recording.

The sixth code segment may be additionally for automatically activating the second grammar in response to the deactivating of the first grammar. Alternatively, the sixth code segment may be additionally for inputting a second-grammar activation signal from a user. In this case, the second-grammar activation signal may activate the second data entry mechanism associated with the second category for data entry.

The second-grammar activation signal may include third voice data, and a tenth code segment may be included for matching the third voice data against a portion of a third grammar, wherein the third grammar remains active regardless of whether the first grammar or the second grammar are activated. Alternatively, the second-grammar activation signal may include a physical input.

According to another general aspect, a system may comprise a first storage area operable to store a first grammar, a second storage area operable to store a second grammar, the second grammar being independent from the first grammar, a grammar activation and deactivation system operable to activate the first grammar and ensure that the second grammar is simultaneously inactive, a voice-recognition system operable to input spoken data and match the spoken data against a corresponding portion of the first grammar, and an input indication system operable to indicate the corresponding portion of the first grammar to a user.

Implementations may include one or more of the following features. For example, a third storage area operable to store a third grammar may be included, and the third grammar may be independent from the first grammar and the second grammar and operable to be activated by the activation and deactivation system so that the third grammar and the first grammar are both active for a period of time.

The input indication system may include a field within a graphical user interface operable to display the corresponding portion of the first grammar. The grammar activation and deactivation system may be further operable to output a grammar identifier to the user that identifies which of the first grammar and second grammar is currently active. In this case, the grammar identifier may include a visual cue identifying a first field or a second field within a graphical user interface, the first field and the second field being associated with the first grammar and the second grammar, respectively.

The details of one or more implementations are set forth in the accompanying drawings and the description below. Other features will be apparent from the description, drawings, and the claims.

DETAILED DESCRIPTION

Figure 1:
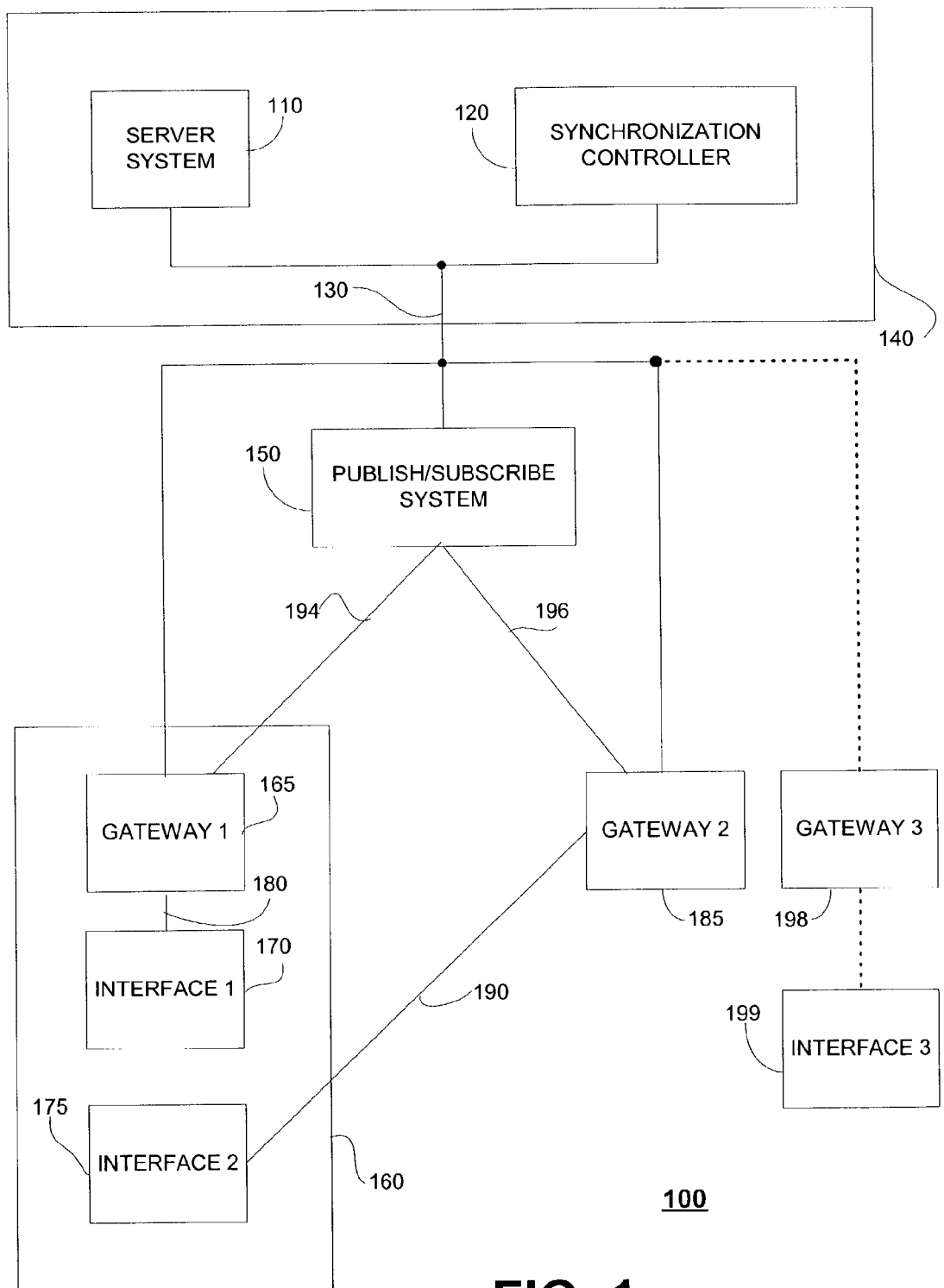
FIG. 1 is an example of a centralized system for synchronizing multiple modes.

In the below description, Section I recites subject matter disclosed in U.S. application Ser. No. 10/131,216, which was filed on Apr. 25, 2002, and incorporated by reference above, in its entirety.

Section II recites subject matter disclosed in U.S. application Ser. No. 10/157,030, which was filed on May 30, 2002, and incorporated by reference above, in its entirety. Section II further recites subject matter disclosed in U.S. application Ser. No. 10/184,069, which was filed on Jun. 28, 2002, and incorporated by reference above, in its entirety.

Section III recites subject matter which was not necessarily explicitly discussed in the previously-mentioned and incorporated applications.

Section I

A user may interface with a machine in many different modes, such as, for example, a mechanical mode, an aural mode, and a visual mode. A mechanical mode may include, for example, using a keyboard for input. An aural mode may include, for example, using voice input or output. A visual mode may include, for example, using a display output. When using a computer to access data over the World-Wide Web ("WWW") a browser may be used, which generally allows a keyboard, a mouse, or a stylus to be used for input and a display to be used for output. Alternatively, voice input and output can be used to access data over the WWW.

In one aspect, a first-modality gateway and a second-modality gateway are synchronized. Both gateways interface between a user and a server system, and synchronizing allows the user to use either of the first-modality gateway or the second-modality gateway at a given point in time to interface with specific information in the server system.

A browser and a voice gateway may be synchronized, and the server system may include web pages. The first-modality gateway and a third-modality gateway may be synchronized, wherein the third-modality gateway interfaces between the user and the server system.

A first-modality page may be sent from the server system to the first-modality gateway in response to receiving at the server system an input from the first-modality gateway. A second-modality page may be determined that corresponds to the first-modality page. The second-modality page may be sent from the server system to the second-modality gateway.

Sending the first-modality page from the server system to the first-modality gateway may include a web server sending a voice extensible markup language ("VXML") page to a voice gateway in response to receiving at the web server the input from the voice gateway. Determining the second-modality page may include the web server determining a hypertext markup language ("HTML") page that corresponds to the VXML page. Sending the second-modality page may include the web server sending the determined HTML page to a browser. The web server may receive a refresh request from the browser before the web server sends the determined HTML page.

Sending the first-modality page from the server system to the first-modality gateway may include a web server sending a VXML page to a voice gateway in response to receiving at the web server the input from the voice gateway. Determining the second-modality page may include the web server determining a HTML page that corresponds to the VXML page. Sending the second-modality page to the second-modality gateway may include the web server sending the determined HTML page to a browser by sending the determined HTML page to a publish/subscribe system with the result that the publish/subscribe system sends the determined HTML page to the browser.

Sending the first-modality page from the server system to the first-modality gateway may include a web server sending a HTML page to a browser in response to receiving at the web server the input from the browser. Determining the second-modality page may include the web server determining a VXML page that corresponds to the HTML page. Sending the second-modality page to the second-modality gateway may include the web server sending the determined VXML page to a voice gateway by sending the VXML page to a publish/subscribe system with the result that the publish/subscribe system sends the VXML page to the voice gateway.

Sending the first-modality page from the server system to the first-modality gateway may include a web server sending a HTML page to a browser in response to receiving at the web server the input from the browser. Determining the second-modality page may include the web server determining a VXML page that corresponds to the HTML page. Sending the second-modality page to the second-modality gateway may include the web server sending the determined VXML page to a voice gateway. The web server may receive a request from the voice gateway when the voice gateway has received no voice input for a specified amount of time, and the web server may receive the request before the web server sends the determined VXML page to the voice gateway.

Synchronizing may include receiving a request for a first-modality page from the first-modality gateway, determining a second-modality page that corresponds to the first-modality page, and requesting the second-modality page. Receiving the request for the first-modality page from the first-modality gateway may include a controller receiving the request for a HTML page from a browser, the controller being physically separate from the browser. Determining the second-modality page may include the controller determining a VXML page that corresponds to the HTML page. Requesting the second-modality page may include the controller requesting the determined VXML page from a voice gateway, the controller being physically separate from the voice gateway and from the server system.

Receiving the request for the first-modality page from the first-modality gateway may include a controller receiving the request for a VXML page from a voice gateway, the controller and the voice gateway residing on a mobile device. Determining the second-modality page may include the controller determining a HTML page that corresponds to the VXML page. Requesting the second-modality page may include the controller requesting the determined HTML page from a web server.

Synchronizing may include receiving a request for a first-modality page from the first-modality gateway, determining a second-modality page that corresponds to the first-modality page, and sending an identifier of the second-modality page to the second-modality gateway. Receiving the request for the first-modality page from the first-modality gateway may include a controller receiving the request for a HTML page from a browser, the controller and the browser residing on a mobile device. Determining a second-modality page may include the controller determining a VXML page that corresponds to the HTML page. Sending an identifier of the second-modality page to the second-modality gateway may include the controller sending a uniform resource locator ("URL") of the determined VXML page to a voice gateway, the voice gateway residing on the mobile device.

Synchronizing may include receiving a request for a first-modality page from a first-modality interface, accessing an identifier of a second-modality page where the second-modality page corresponds to the first-modality page, and requesting the second-modality page. Receiving the request for the first-modality page from the first-modality interface may include a controller receiving the request for a VXML page from a voice interface, the controller being physically separate from the voice interface. Accessing the identifier of the second-modality page may include the controller accessing a URL for a HTML page that corresponds to the VXML page, wherein the URL is supplied by a voice gateway that is physically separate from the controller. Requesting the second-modality page may include the controller requesting the corresponding HTML page for a browser from a web server, the controller being physically separate from the web server and the browser.

Synchronizing the first-modality gateway and the second-modality gateway may include receiving from a first-modality interface a first item relating to first data, and determining second data, the second data corresponding to the first data. Receiving from the first-modality interface the first item relating to first data may include a controller receiving from a voice interface a request for a VXML page, the first item comprising the request and the first data comprising the VXML page, the controller being physically separate from the voice interface. Determining second data, the second data corresponding to the first data, may include the controller determining a HTML page that corresponds to the VXML page. The controller may request the determined HTML page for a browser from a web server, the controller being physically separate from the browser and the web server. The second data may be provided to the second-modality interface.

Receiving the first item may include receiving a request for a first web page, the first web page being identified by a first uniform resource locator ("URL") and the first data including the first URL. Determining the second data may include determining a second URL for a second web page, the second web page corresponding to the first web page, and the second data including the second URL.

Synchronizing the first-modality gateway and the second-modality gateway may include receiving from the first-modality gateway a first item relating to a first data, and determining a second data, the second data corresponding to the first data. A controller may receive the first item, and the controller may determine the second data. The second data may be provided to the second-modality gateway. The second data may be provided to the second-modality gateway after waiting for the second-modality gateway to request the second data. The second-modality gateway may be notified to request the second data. Notifying the second-modality gateway may include a controller notifying the second-modality gateway through a publish/subscribe system, and the controller may provide the second data. Notifying the second-modality gateway may include a controller notifying the second-modality gateway by sending a refresh inquiry response, and providing the second data may include a controller providing the second data.

An identifier of the second data may be maintained. The second-modality gateway may be provided a pointer to the identifier of the second data. The second data may be requested from the server system. Requesting the second data from the server system may include a controller requesting the second data from a storage medium that is local with respect to the controller, wherein the server system includes the storage medium. Requesting the second data from the server system may include a controller requesting the second data from a storage medium that is remote with respect to the controller, wherein the server system includes the storage medium. An identifier of the second data may be provided to the second-modality gateway. Determining the second data may include receiving an identifier of the second data from the first-modality gateway.

In another aspect, a communication sent from a first-modality gateway is accessed, and a synchronizing mechanism is provided in response to accessing the communication. The synchronizing mechanism is capable of use in synchronizing the first-modality gateway and a second-modality gateway, and both gateways interface between a user and a server system. Accessing a communication may include receiving a request for a first item, and providing a synchronizing mechanism may include determining a second item that corresponds to the first item, and sending the second item to the second-modality gateway. Accessing a communication may include receiving a request for a first item, and providing a synchronizing mechanism may include determining a second item that corresponds to the first item, determining an identifier of the second item, and sending the identifier to the second-modality gateway. Accessing a communication may include receiving an item, and providing a synchronizing mechanism may include determining the identity of the second-modality gateway, and sending the item to the second-modality gateway. Receiving an item may include receiving a text entry entered by a user.

In another aspect, a request for a first-modality data from a first-modality entity is received, a second-modality data is determined where the second-modality data corresponds to the first-modality data, and the second-modality data is provided to a second-modality entity. The first-modality entity may include a first-modality gateway, and the second-modality entity may include a second-modality gateway.

In another aspect, a storage medium has stored thereon instructions that when executed by a machine result in synchronizing a first-modality gateway and a second-modality gateway. Both gateways are adapted to interface between a user and a server system. The synchronizing allows the user to use either of the first-modality gateway or the second-modality gateway at a given point in time to interface with specific information in the server system. A first-modality interface may be adapted to be coupled to the first-modality gateway, and a second-modality interface may be adapted to be coupled to the second-modality gateway.

In another aspect, a controller interface includes instructions that when executed by a machine result in interfacing a first-modality interface and a second-modality interface to a controller that provides synchronization of the first-modality interface and the second-modality interface. The first-modality interface may include a browser interface.

In another aspect, one or more components implemented in hardware, firmware, or software, are adapted to receive a request for a first-modality page from a first-modality gateway, to determine a second-modality page that corresponds to the first-modality page, and to request the second-modality page. The first-modality gateway may include a browser, and the second modality gateway may include a voice gateway. Advantages of the implementations described may include: (i) allowing a user to use multiple modalities to interface with data over a network such as, for example, the WWW, (ii) enabling such multiple modality use in a mobile device, (iii) allowing such a mobile device to be designed without incorporating the synchronization functionality, (iv) enabling a web server design to remain relatively constant by performing the synchronization functionality in an intermediary between a user device and the server, (v) enabling a distributed architecture that can synchronize multiple devices, (vi) enabling multi-modal interactions that require minimum installation time, or even zero-install time at a client device, such as, for example, a personal digital assistant, and (vii) providing synchronization of multiple modalities using existing standards-based representation of data content, such as, for example, HTML and VXML.

Introduction to a Particular Implementation

According to an implementation, discussed more fully with respect to FIG. 2 below, a user may use multiple modes to interface to the WWW. For example, a user may use a browser and, at the same time, use aural input and output. The aural interface and the browser can be synchronized, thereby allowing the user to choose whether to use the browser or voice for a particular input. The implementation may remain synchronized by updating both the browser and a voice gateway with corresponding data. For example, when a user clicks on a link the browser will display the desired web page and the voice gateway will receive the corresponding voice-based web page so that the user can receive voice prompts corresponding to the displayed page, and so that the user can enter voice input corresponding to the displayed page.

Centralized Implementations

Referring to FIG. 1, a system 100 for synchronizing multiple modes includes a server system 110 and a synchronization controller 120 that may communicate with each other over a connection 130 and are included in a common unit 140. The server system 110 and/or the synchronization controller 120 may communicate with a publish/subscribe system 150 over the connection 130.

The system 100 includes a device 160. The device 160 includes a first gateway 165, a first interface 170, and a second interface 175. The first gateway 165 and the first interface 170 may communicate over a connection 180. The system 100 includes a second gateway 185 that may communicate with the second interface 175 over a connection 190. Either or both of the first and second gateways 165, 185 may communicate with either the server system 110 and/or the synchronization controller 120 over the connection 130. The first and second gateways may communicate with the publish/subscribe system 150 over connections 194, 196 respectively.

An "interface" refers to a component that either accepts input from a user or provides output to a user. Examples include a display, a printer, a speaker, a microphone, a touch screen, a mouse, a roller ball, a joystick, a keyboard, a temperature sensor, a light sensor, a light, a heater, an air quality sensor such as a smoke detector, and a pressure sensor. A component may be, for example, hardware, software, or a combination.

A "gateway" refers to a component that translates between user input/output and some other data format. For example, a browser is a gateway and it translates the user's clicks and typing into hypertext transfer protocol ("HTTP") messages, and translates received HTML into a format that the user can understand.

The system 100 optionally includes a third gateway 198 and a third interface 199. The third gateway optionally communicates directly with the unit 140 over the connection 130. The third gateway 198 represents the multiplicity of different modes that may be used in different implementations, and the fact that the gateways and interfaces for these modes may be remote from each other and from the other gateways and interfaces. Examples of various modes of input or output include manual, visual (for example, display or print), aural (for example, voice or alarms), haptic, pressure, temperature, and smell. Manual modes may include, for example, keyboard, stylus, keypad, button, mouse, touch (for example, touch screen), and other hand inputs.

A modality gateway or a modality interface refers to a gateway (or interface) that is particularly adapted for a specific mode, or modes, of input and/or output. For example, a browser is a modality gateway in which the modality includes predominantly manual modes of input (keyboard, mouse, stylus), visual modes of output (display), and possibly aural modes of output (speaker). Thus, multiple modes may be represented in a given modality gateway. Because a system may include several different modality gateways and interfaces, such gateways and interfaces are referred to as a first-modality gateway, a first-modality interface, a second-modality gateway, a second-modality interface, etc.

More broadly, a first-modality entity refers to a component that is particularly adapted for a specific mode, or modes, of input and/or output. A first-modality entity may include, for example, a first-modality gateway or a first-modality interface.

A first-modality data item refers to a data item that is used by a first-modality entity. The data item need not be provided in one of the modes supported by the first-modality entity, but rather, is used by the first-modality entity to interface with the user in one of the supported modes. For example, if a voice gateway is a first-modality gateway, then a first-modality data item may be, for example, a VXML page. The VXML is not itself voice data, but can be used to provide a voice interface with a user.

Figure 2:
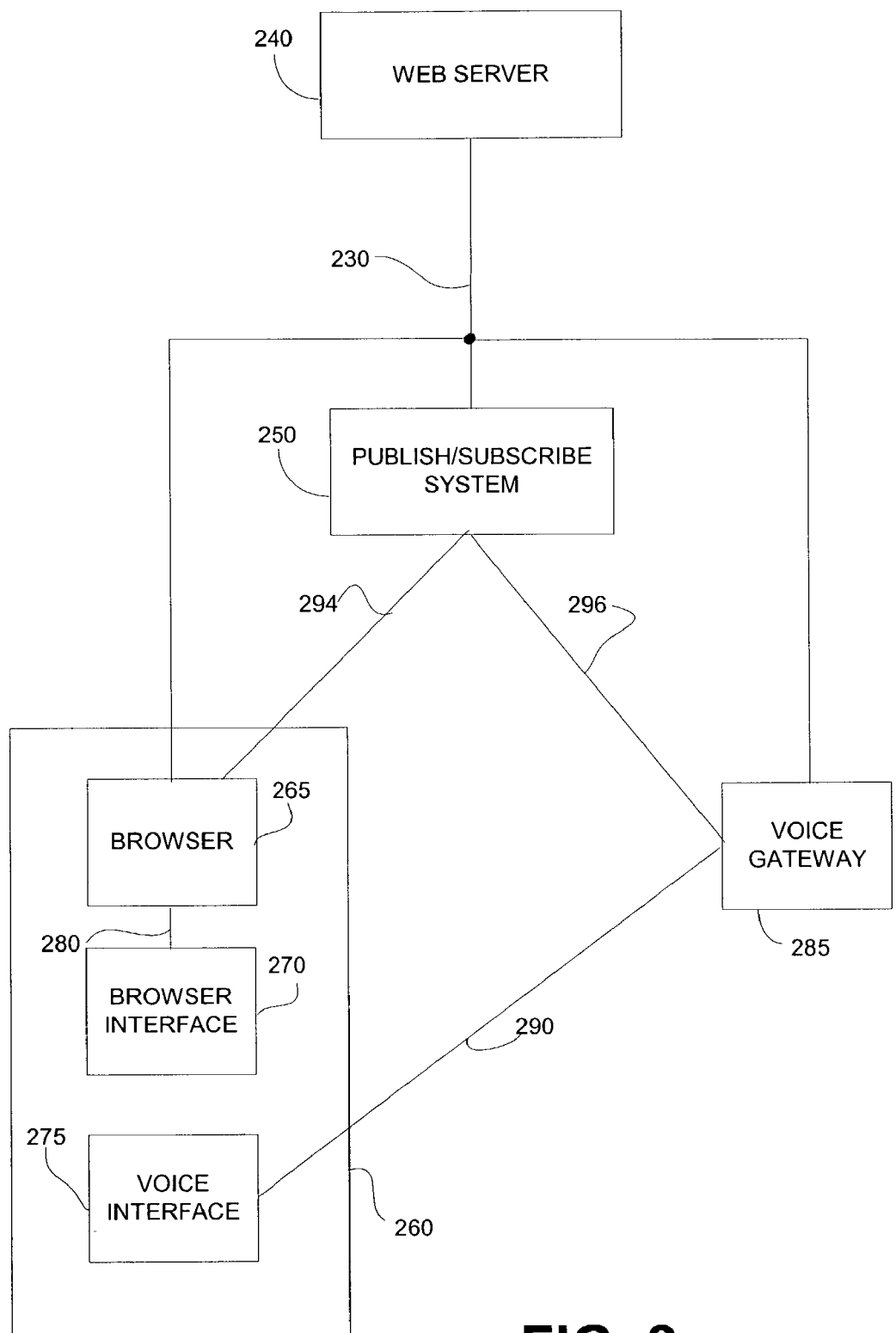
FIG. 2 is an example of an implementation of the system of FIG. 1.

Referring to FIG. 2, a system 200 is one example of an implementation of the system 100. The control unit 140 is implemented with a web server 240 that includes a synchronization controller (see 120). The first gateway 165 and the first interface 170 are implemented with a browser 265 and a browser interface 270, respectively. The second gateway 185 and the second interface 175 are implemented with a voice gateway 285 and a voice interface 275, respectively. The device 160 is implemented with a device 260 that may be, for example, a computer or a mobile device. A publish/subscribe system 250 is analogous to the publish/subscribe system 150. Connections 230, 280, 290, 294, 296 are analogous to the connections 130, 180, 190, 194, 196.

The voice interface 275 may include, for example, a microphone and a speaker. The voice interface 275 may be used to send voice commands to, and receive voice prompts from, the voice gateway 285 over the connection 290. The commands and prompts may be transmitted over the connection 290 using, for example, voice telephony services over an Internet protocol ("IP") connection (referred to as voice over IP, or "VoIP"). The voice gateway 285 may perform the voice recognition function for incoming voice data. The voice gateway 285 may also receive VXML pages from the web server 240 that include dialogue entries for interacting with the user using voice. The voice gateway 285 may correlate recognized words received from the user with the dialogue entry to determine how to respond to the user's input. Possible responses may include prompting the user for additional input or executing a command based on the user's input.

The browser 265 operates in an analogous manner to the voice gateway 285. However, the browser 265 uses HTML pages rather than VXML pages. Also, the browser 265 and the user often communicate using manual and visual modes such as, for example, a keyboard, a mouse and a display, rather than using voice. Although the browser 265 may be capable of using an aural mode, it is generally restricted to output, such as, for example, providing music over a speaker. Although the system 200 shows an implementation tailored to the modes of manual and voice input, and display and voice output, alternative and additional modes may be supported.

The publish/subscribe system 250 may function, for example, as a router for subscribed entities. For example, if the gateways 265, 285 are subscribed, then the publish/subscribe system 250 may route messages from the web server 240 to the gateways 265, 285.

The operation of the system 200 is explained with reference to FIGS. 3–6 that depict examples of processes that may be performed using the system 200. Four such processes are described, all dealing with synchronizing two gateways after a user has navigated to a new page using one of the two gateways. The four processes are: server push, browser pull, voice-interrupt listener, and no-input tag.

Figure 3:
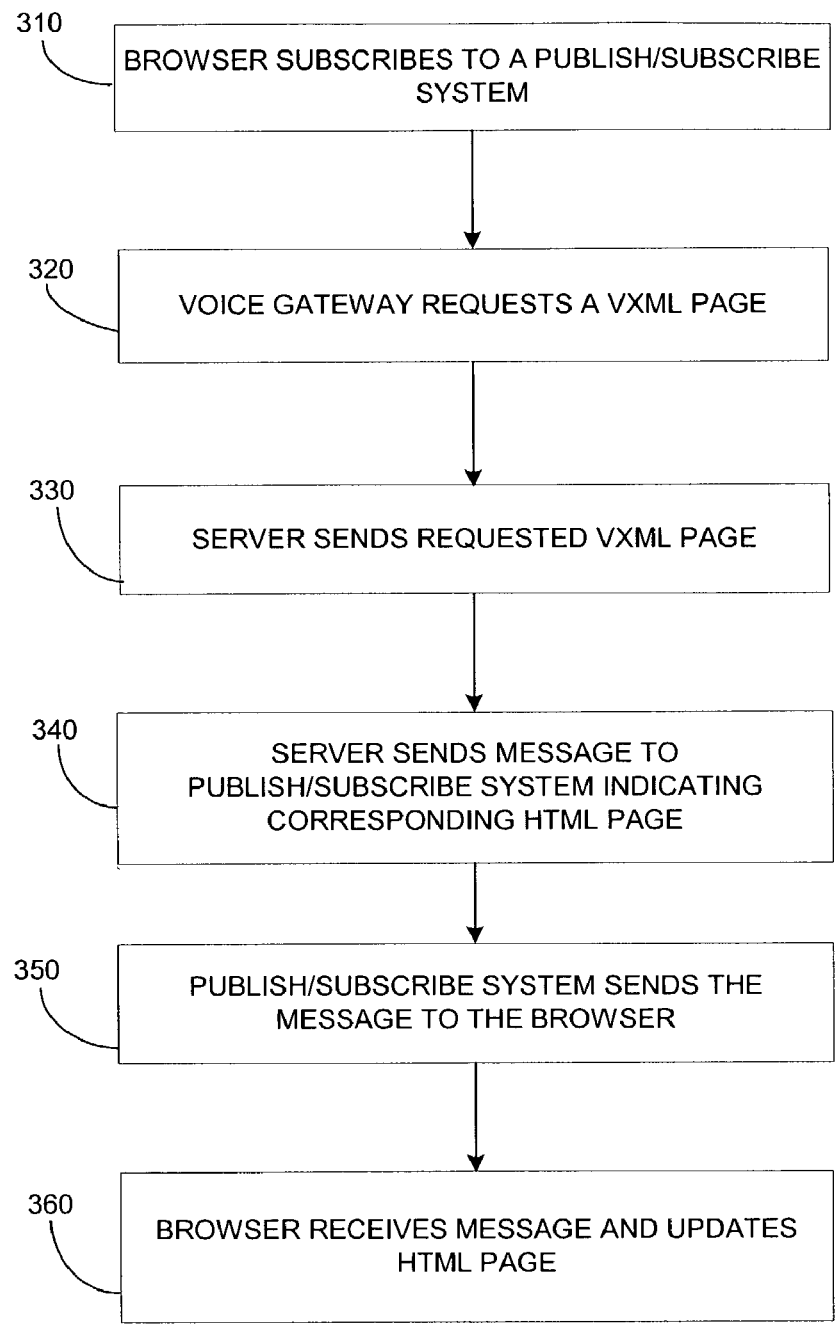
FIG. 3 is an example of a server-push process for synchronizing a browser after a voice gateway requests a VXML page.

Referring to FIG. 3, a process 300, referred to as server push, for use with the system 200 includes the browser 265 subscribing to the publish/subscribe system 250 (310). Subscription may be facilitated by the web server 240 inserting a function call into an HTML page. When the browser 265 receives and loads the page, the function call is executed and posts a subscription to the publish/subscribe system 250. The subscription includes a callback pointer or reference, which is inserted into the subscription so that upon receiving a published message the publish/subscribe system 250 can provide the message to the browser 265. After subscribing, the browser 265 then listens to the publish/subscribe system 250 for any messages. In one implementation, the browser 265 uses multiple frames including a content frame, a receive frame, and a send frame. The send frame is used to subscribe. The receive frame is used to listen. And the content frame is the only frame that displays content. Subscription (310) may be delayed in the process 300, but occurs before the browser 265 receives a message (see 350).

The process 300 includes the voice gateway 285 requesting a VXML page (320), and the web server 240 sending the VXML page to the voice gateway 285 (330). Note that the browser 265 and the voice gateway 285 are the gateways to be synchronized in the implementation of the process 300 being described. The operations 320 and 330 may be initiated, for example, by a user providing a voice command to the voice gateway 285 telling the voice gateway 285 to navigate to a new web page. The web server 240 may delay sending the VXML page until later in the process 300. Such a delay might be useful to better time the arrival of the requested VXML page at the voice gateway 285 with the arrival of the corresponding HTML page at the browser 265.

A page may be, for example, a content page or a server page. A content page includes a web page, which is what a user commonly sees or hears when browsing the web. Web pages include, for example, HTML and VXML pages. A server page includes a programming page such as, for example, a Java Server Page ("JSP"). A server page may also include content.

The process 300 includes the web server 240 sending a message to the publish/subscribe system 250 indicating the HTML page that corresponds to the VXML page sent to the voice gateway 285 (340). The web server 240 may recognize, or perhaps assume, that the voice gateway 285 and the browser 265 are out of synchronization, or that the two gateways 265, 285 will become out of synchronization, due to the VXML page being sent to the voice gateway 285. Accordingly, the web server 240 sends the message to the publish/subscribe system 250, intended for the browser 265, to bring the two gateways 265, 285 into synchronization. The web server 240 may send the message by using, for example, a HTTP post message with an embedded JavaScript command that indicates the corresponding HTML page. The web server 240 need not designate the particular browser 265 for which the message is intended (by, for example, specifying an IP address and a port number). Rather, the web server 240 sends a message configured for a specific "topic" (usually a string parameter). All subscribers to that topic will receive the message when the message is published by the web server 240 via the publish/subscribe system 250.

The web server 240 may determine the corresponding HTML page in a variety of ways. For example, if the VXML page request was the voice equivalent of a click on a link, then the VXML data may contain the uniform resource locator ("URL") for the corresponding HTML page. Alternatively, for example, the web server 240 may access a database containing URLs of corresponding VXML and HTML pages, or perform a URL translation if the corresponding pages are known to have analogous URLs.

"Synchronizing," as used in this disclosure, refers to bringing two entities into synchronization or maintaining synchronization between two entities. Two gateways are said to be synchronized, for the purposes of this disclosure, when, at a given point in time, a user can use either of two modes to interface with specific information, the interfacing including either input or output.

Two items "correspond," as used in this disclosure, if they both can be used by a different modality gateway to allow a user to interface with specific information. For example, an HTML page corresponds to a VXML page if the HTML page allows the user to interface with some of the same information as does the VXML page. An item may correspond to itself if two gateways can use the item to allow a user to interface with information in the item using different modalities.

The process 300 includes the publish/subscribe system 250 receiving the message from the web server 240 and sending the message to the browser 265 (350). The publish/subscribe system 250 may use another HTTP post message to send the message to all subscribers of the specified topic. In such an implementation, the publish/subscribe system 250 may utilize a call-back pointer or reference that may have been inserted into the subscription from the browser 265.

The process 300 includes the browser 265 receiving the message (360). The browser 265 is assumed to be in a streaming HTTP mode, meaning that the HTTP connection is kept open between the browser 265 and the publish/subscribe system 250. Because the browser 265 is subscribed, a HTTP connection is also kept open between the publish/subscribe system 250 and the web server 240. The web server 240 repeatedly instructs the browser 265, through the publish/subscribe system 250, to "keep alive" and to continue to display the current HTML page. These "keep alive" communications are received by the receive frame of the browser 265 in an interrupt fashion. When the web server message arrives indicating the corresponding HTML page, the browser 265 receives the message in the browser receive frame and executes the embedded JavaScript command. Executing the command updates the content frame of the browser 265 by redirecting the content frame to another HTML page.

Figure 4:
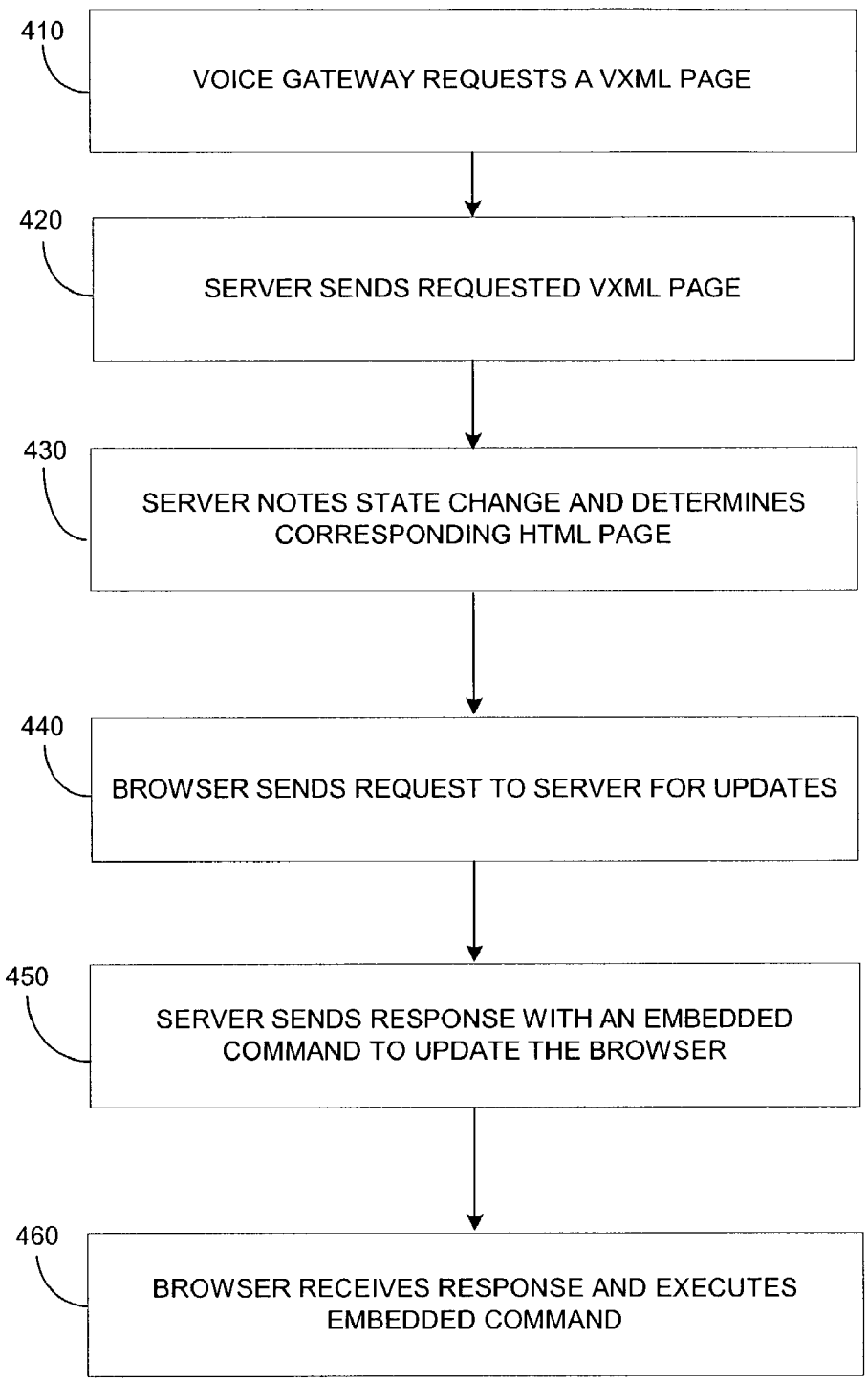
FIG. 4 is an example of a browser-pull process for synchronizing a browser after a voice gateway requests a VXML page.

Referring to FIG. 4, a process 400, referred to as browser pull, for use with the system 200 includes the voice gateway 285 requesting a VXML page (410), and the web server 240 sending the requested VXML page to the voice gateway 285 (420). The web server 240 may delay sending the VXML page until later in the process 400 in order, for example, to better time the arrival of the requested VXML page at the voice gateway 285 with the arrival of the corresponding HTML page at the browser 265.

The process 400 includes the web server 240 noting that the state of the voice gateway 285 has changed and determining the corresponding page that the browser 265 needs in order to remain synchronized (430). The web server 240 thus tracks the state of the gateways 265, 285.

The process 400 includes the browser 265 sending a request to the web server 240 for any updates (440). The requests are refresh requests or requests for updates, and the browser 265 sends the requests on a recurring basis from a send frame using a HTTP get message.

The process 400 includes the web server 240 sending a response to update the browser 265 (450). Generally, the web server 240 responds to the refresh requests by sending a reply message to the browser receive frame indicating "no change." However, when the voice gateway 285 has requested a new VXML page, the web server 240 embeds a JavaScript command in the refresh reply to the browser 265 that, upon execution by the browser 265, will result in the browser 265 coming to a synchronized state. The JavaScript command, for example, instructs the browser 265 to load a new HTML page.

The process 400 includes the browser 265 receiving the response and executing the embedded command (460). Upon executing the embedded command, the browser 265 content frame is updated with the corresponding HTML page. The command provides the URL of the corresponding page. In another implementation, the web server 240 sends a standard response indicating "no change," and instructing the browser 265 to reload the current HTML page from the web server 240. However, the web server 240 also embeds a command in the current HTML page on the web server 240, and the command indicates the corresponding HTML page. Thus, when the current HTML page is requested, received, and loaded, the browser 265 will execute the embedded command and update the HTML page.

Figure 5:
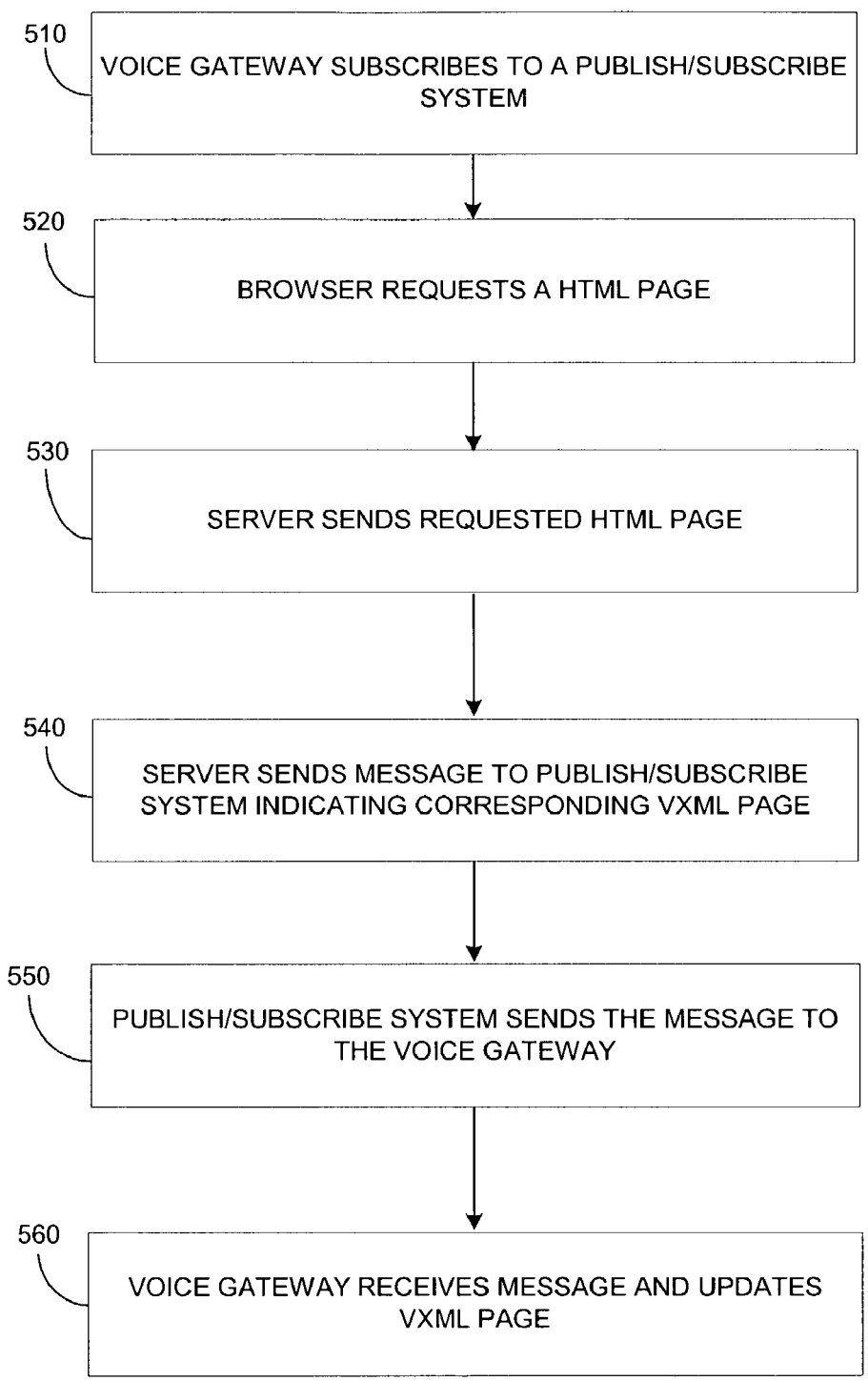
FIG. 5 is an example of a voice-interrupt listener process for synchronizing a voice gateway after a browser requests a HTML page.

Referring to FIG. 5, a process 500, referred to as voice-interrupt listener, for use with the system 200 includes the voice gateway 285 subscribing to the publish/subscribe system 250 (510). A function call may be embedded in a VXML page received from the web server 240, and the function call may be executed by the voice gateway 285 to subscribe to the publish/subscribe system 250. The voice gateway 285 can subscribe at various points in time such as, for example, when the voice gateway 285 is launched or upon receipt of a VXML page. In contrast to a browser, the voice gateway does not use frames. Subscription (510) may be delayed in the process 500, but occurs before the voice gateway 285 receives a message (see 550).

The process 500 includes the browser 265 requesting from the web server 240 a HTML page (520) and the web server 240 sending to the browser 265 the requested HTML page (530). This may be initiated, for example, by a user selecting a new URL from a "favorites" pull-down menu on the browser 265. The web server 240 may delay sending the requested HTML page (530) until later in the process 500 in order, for example, to better time the arrival of the requested HTML page at the browser 265 with the arrival of the corresponding VXML page at the voice gateway 285.

The process 500 includes the web server 240 sending a message to the publish/subscribe system 250 indicating a corresponding VXML page (540). The web server 240 sends a HTTP post message to the publish/subscribe system 250, and this message includes a topic to which the voice gateway 285 is subscribed. The web server 240 also embeds parameters, as opposed to embedding a JavaScript command, into the message. The embedded parameters indicate the corresponding VXML page.

The process 500 includes the publish/subscribe system 250 sending the message to the voice gateway 285 (550). The publish/subscribe system 250 may simply reroute the message to the subscribed voice gateway 285 using another HTTP post message.

The process 500 includes the voice gateway 285 receiving the message (560). The voice gateway 285 is assumed to be in a streaming HTTP mode, listening for messages and receiving recurring "keep alive" messages from the publish/subscribe system 250. When the voice gateway 285 receives the new message from the web server 240, the voice gateway 285 analyzes the embedded parameters and executes a command based on the parameters. The command may be, for example, a request for the corresponding VXML page from the web server 240.

Figure 6:
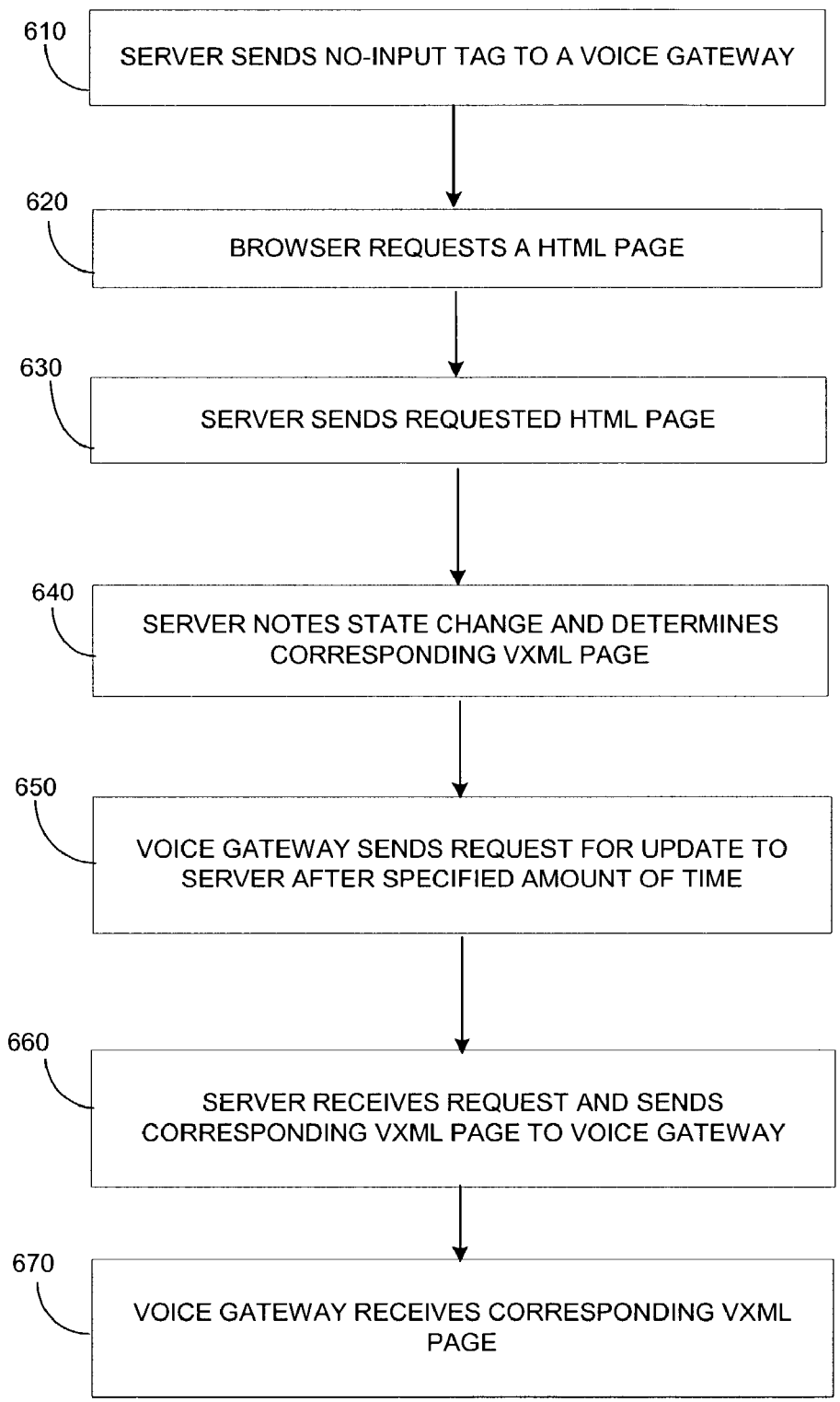
FIG. 6 is an example of a no-input tag process for synchronizing a voice gateway after a browser requests a HTML page.

Referring to FIG. 6, a process 600, referred to as no-input tag, for use with the system 200 includes the web server 240 sending the voice gateway 285 a VXML page with a no-input tag embedded (610). Every VXML page may have a no-input markup tag (<no input>) that specifies code on the voice gateway 285 to run if the voice gateway 285 does not receive any user input for a specified amount of time. The URL of a JSP is embedded in the code, and the code tells the voice gateway 285 to issue a HTTP get command to retrieve the JSP. The same no-input tag is embedded in every VXML page sent to the voice gateway 285 and, accordingly, the no-input tag specifies the same JSP each time.

The process 600 includes the browser 265 requesting a HTML page (620), the web server 240 sending the requested HTML page to the browser 265 (630), and the web server 240 noting the state change and determining a corresponding VXML page (640). The web server 240 updates the contents of the JSP, or the contents of a page pointed to by the JSP, with information about the corresponding VXML page. Such information may include, for example, a URL of the corresponding VXML page. The web server 240 may delay sending the requested HTML page (630) until later in the process 600 in order, for example, to better time the arrival of the requested HTML page at the browser 265 with the arrival of the corresponding VXML page at the voice gateway 285.

The process 600 includes the voice gateway 285 waiting the specified amount of time and sending a request for an update (650). After the specified amount of time, determined by the code on the voice gateway 285, has elapsed, the voice gateway 285 issues a HTTP get command for the JSP. When no user input is received for the specified amount of time, the user may have entered input using a non-voice mode and, as a result, the voice gateway 285 may need to be synchronized.

The process 600 includes the web server 240 receiving the update request and sending the corresponding VXML page to the voice gateway 285 (660). The JSP contains an identifier of the corresponding VXML page, the identifier being, for example, a URL or other type of pointer. The web server 240 issues a HTTP post message to the voice gateway 285 with the VXML page corresponding to the current HTML page.

The process 600 includes the voice gateway 285 receiving the corresponding VXML page (670). When the voice gateway 285 receives and loads the corresponding VXML page and the browser 265 receives and loads the HTML (see 630), the two gateways 265, 285 are synchronized. It is possible, however, that the two gateways 265, 285 were never unsynchronized because the user did not enter a browser input, in which case the voice gateway 285 simply reloaded the current VXML page after no voice input was received during the specified amount of waiting time.

The process 600 has an inherent delay because it waits for the voice gateway 285 to ask for an update. It is possible, therefore, that the voice gateway 285 will be out of synchronization for a period of time on the order of the predetermined delay. A voice input received while the voice gateway 285 is out of synchronization can be handled in several ways. Initially, if the context of the input indicates that the gateways 265, 285 are out of synchronization, then the voice input may be ignored by the voice gateway 285. For example, if a user clicks on a link and then speaks a command for a dialogue that would correspond to the new page, the voice gateway 285 will not have the correct dialogue. Assuming a conflict, however, the web server 240 may determine that the gateways 265, 285 are not in synchronization and may award priority to either gateway. Priority may be awarded, for example, on a first-input basis or priority may be given to one gateway as a default.

Fused Implementations

Figure 7:
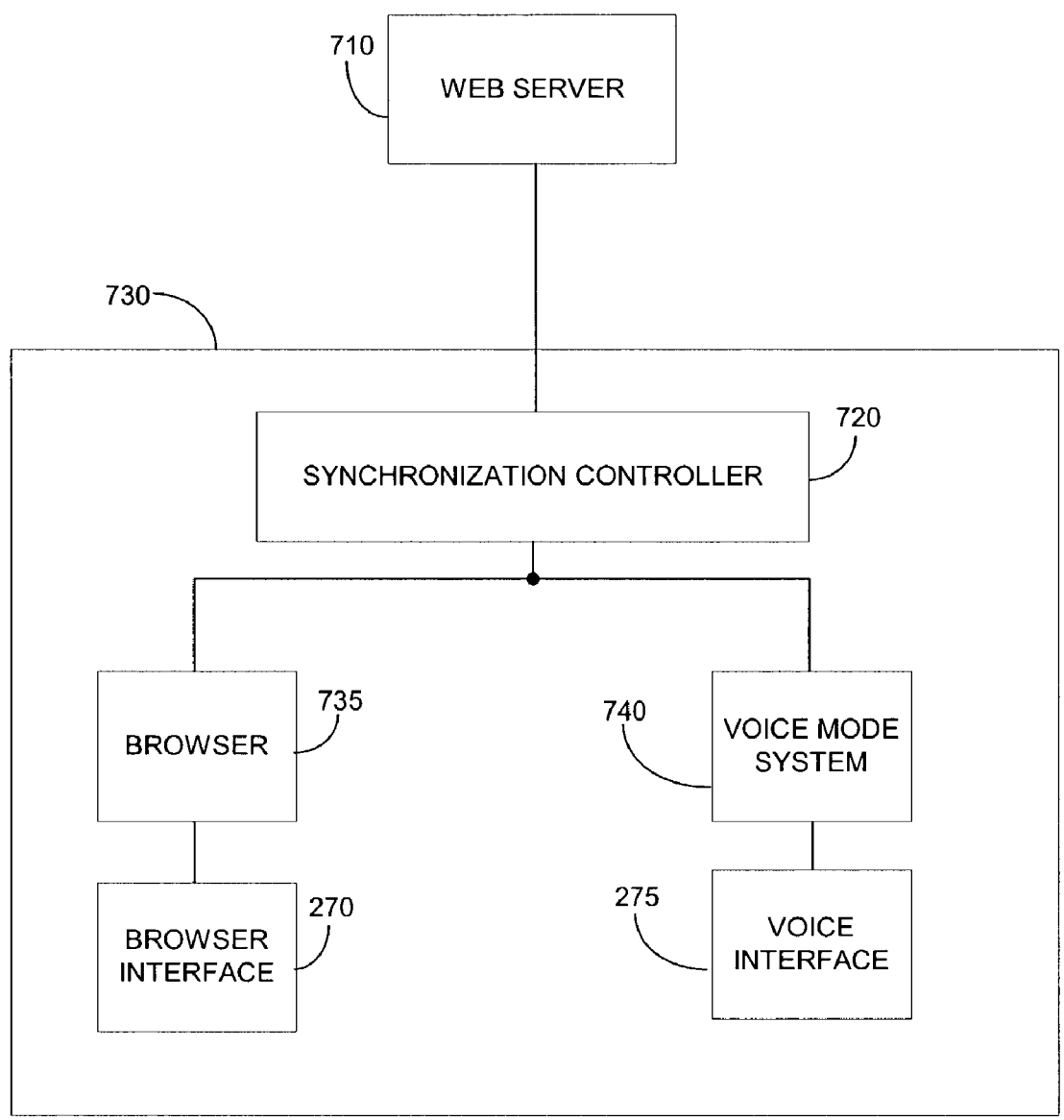
FIG. 7 is an example of a fused system for synchronizing multiple modes.

Referring to FIG. 7, a system 700 includes a web server 710 communicating with a synchronization controller 720 on a device 730. The device 730 also includes a browser 735, in communication with the browser interface 270, and a voice mode system 740 in communication with the voice interface 275.

The web server 710 may be, for example, a standard web server providing HTML and VXML pages over a HTTP connection. The device 730 may be, for example, a computer, a portable personal digital assistant ("PDA"), or other electronic device for communicating with the Internet. In one implementation, the device 730 is a portable device, allowing a user to use either browser or voice input and output, to communicate with the Internet. In such an implementation, the web server 710 does not need to be redesigned because all of the synchronization and communication is handled by the synchronization controller 720.

The voice mode system 740 stores VXML pages that are of interest to a user and allows a user to interface with these VXML pages using voice input and output. The VXML pages can be updated or changed as desired and in a variety of ways, such as, for example, downloading the VXML pages from the WWW during off-peak hours. The voice mode system 740 is a voice gateway, but is referred to as a voice mode system to note that it is a modified voice gateway. The voice mode system 740 performs voice recognition of user voice input and renders output in a simulated voice using the voice interface 275.

Figure 8:
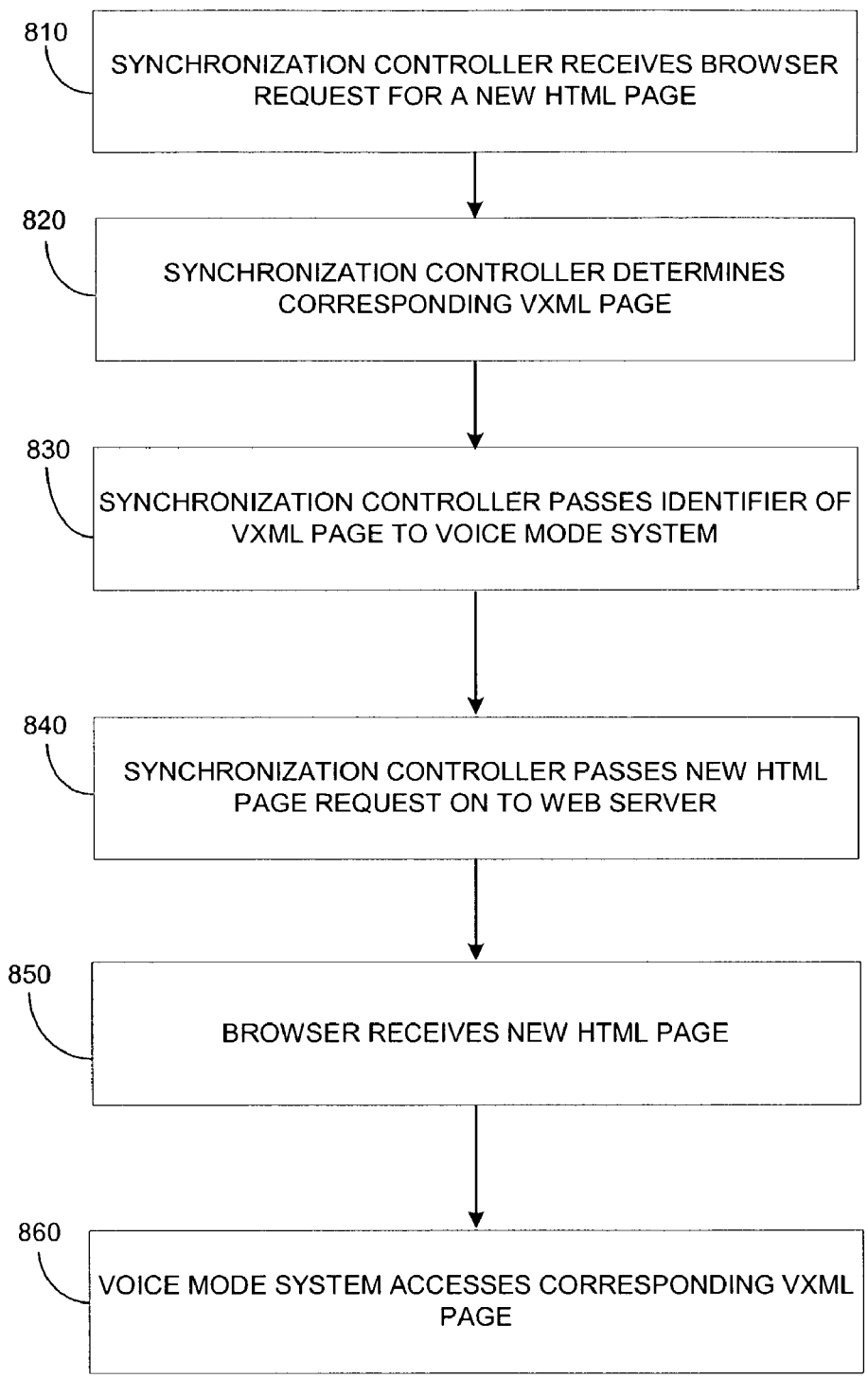
FIG. 8 is an example of a process for synchronizing a browser and a voice mode in the system of FIG. 7 after a browser input.
Figure 9:
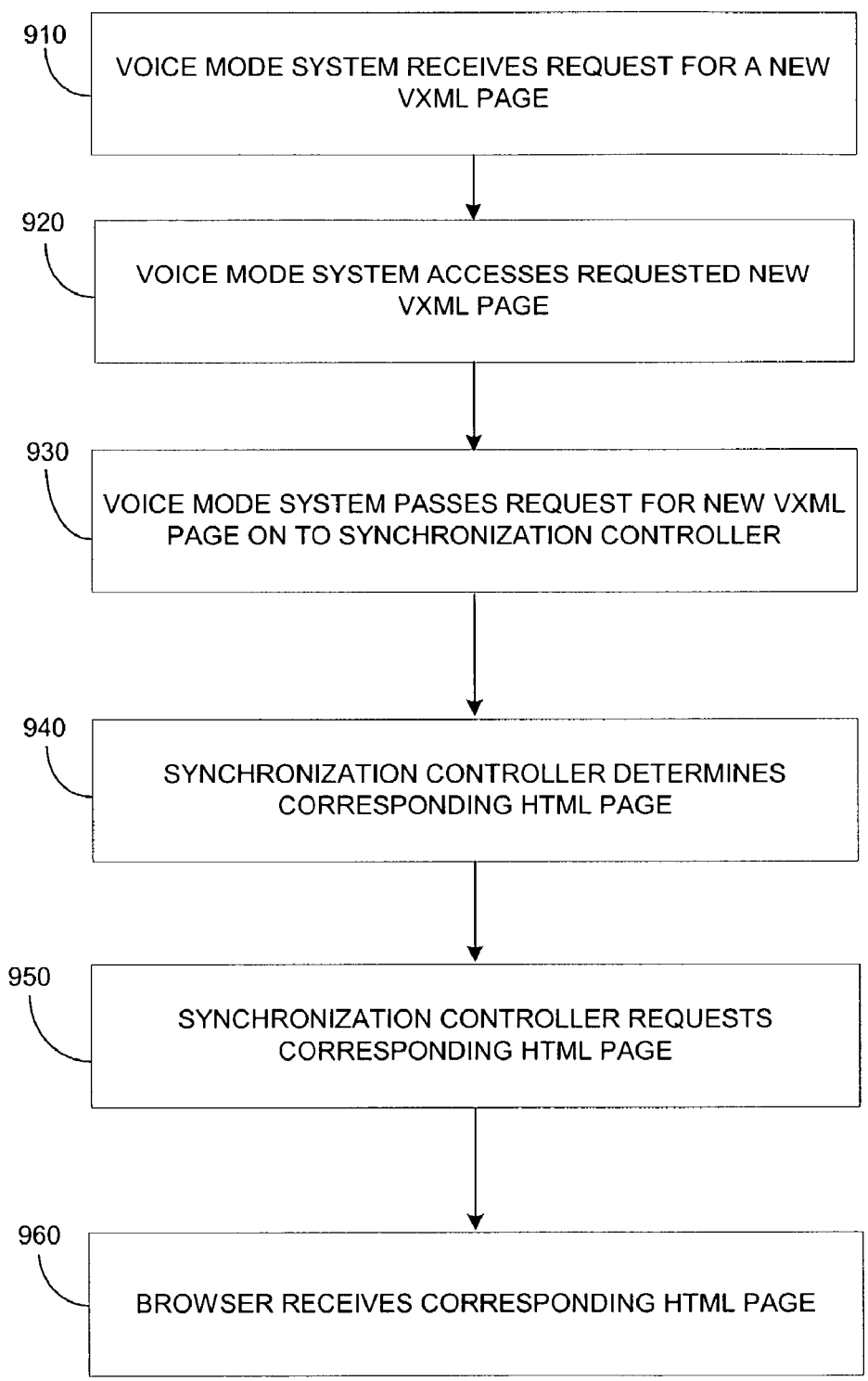
FIG. 9 is an example of a process for synchronizing a browser and a voice mode in the system of FIG. 7 after a voice input.

The synchronization controller 720 also performs synchronization between the browser and voice modes. Referring to FIGS. 8 and 9, two processes are described for synchronizing the browser 735 and the voice mode system 740, or alternatively, the browser interface 270 and the voice interface 275.

Referring to FIG. 8, a process 800 includes the synchronization controller 720 receiving a browser request for a new HTML page (810). The browser 735 may be designed to send requests to the synchronization controller 720, or the browser 735 may be sending the requests to the web server 710 and the synchronization controller 720 may be intercepting the browser requests.

The process 800 includes the synchronization controller 720 determining a VXML page that corresponds to the requested HTML page (820). In particular implementations, when the user requests a new HTML page by clicking on a link with the browser 735, the HTML data also includes the URL for the corresponding VXML page. Further, the browser 735 sends both the URL for the requested HTML page and the URL for the corresponding VXML page to the synchronization controller 720. The synchronization controller 720 determines the corresponding VXML page simply by receiving from the browser 265 the URL for the corresponding VXML page. The synchronization controller 720 may also determine the corresponding page by, for example, performing a table look-up, accessing a database, applying a translation between HTML URLs and VXML URLs, or requesting information from the web server 710.

The process 800 includes the synchronization controller 720 passing the identifier of the corresponding VXML page to the voice mode system 740 (830). The identifier may be, for example, a URL. In particular implementations, the voice mode system 740 may intercept browser requests for new HTML pages, or the browser 735 may send the requests to the voice mode system 740. In both cases, the voice mode system 740 may determine the corresponding VXML page, rather than the synchronization controller 720 determining the corresponding page (820) and sending an identifier (830).

The process 800 includes the synchronization controller 720 passing the browser's HTML page request on to the server 710 (840). The synchronization controller 720 may, for example, use a HTTP request. In implementations in which the synchronization controller 720 intercepts the browser's request, then operation 840 is performed implicitly. The synchronization controller 720 may delay sending the browser request to the server (840) until later in the process 800 in order, for example, to better time the arrival of the requested HTML page at the browser 735 with the access of the corresponding VXML page at the voice mode system 740 (see 860).

The process 800 includes the browser receiving the requested HTML page (850) and the voice mode system 740 accessing the corresponding VXML page (860). Once these two pages are loaded and available for facilitating interaction with a user, the two modes will be synchronized.

Referring to FIG. 9, a process 900 includes the voice mode system 740 receiving a user request for a new VXML page (910) and accessing the requested VXML page (920). The voice mode system 740 accesses the VXML page from, for example, stored VXML pages. Accessing the requested VXML page (920) may be delayed to coincide with the browser's receipt of the corresponding HTML page in operation 960.

The process 900 includes the voice mode system 740 passing the request for the VXML page on to the synchronization controller 720 (930), and the synchronization controller 720 determining the corresponding HTML page (940). In particular implementations, the voice mode system 740 may determine the corresponding HTML page, or may pass the request for the VXML page directly to the browser 735 with the browser 735 determining the corresponding HTML page.

The process 900 includes the synchronization controller 720 requesting the corresponding HTML page from the web server 710 (950) and the browser receiving the corresponding HTML page (960). The synchronization controller 720 may use, for example, a HTTP get command.

Proxy Implementations

Figure 10:
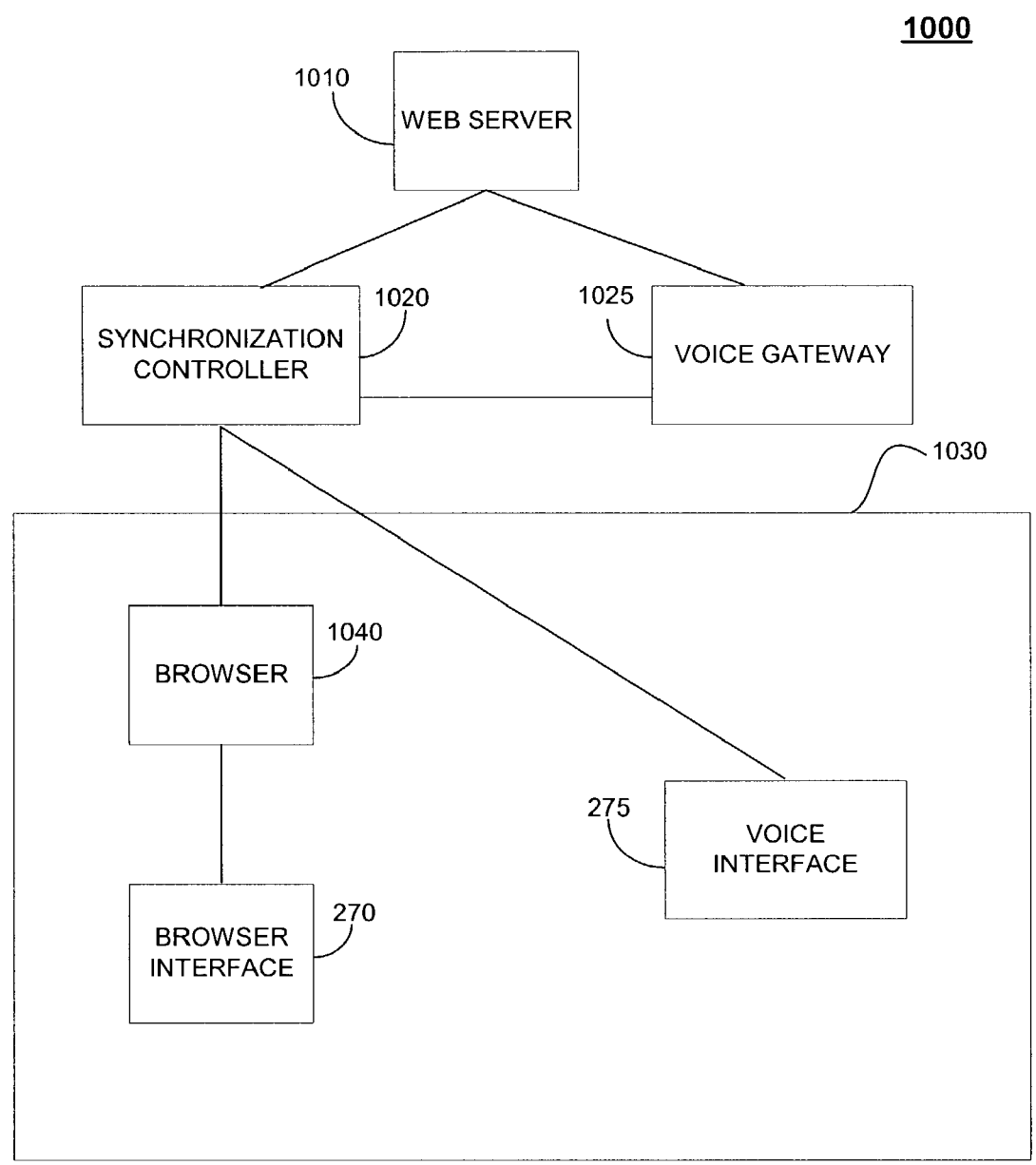
FIG. 10 is an example of a proxy system for synchronizing multiple modes.

Referring to FIG. 10, a system 1000 includes a web server 1010 communicating with both a synchronization controller 1020 and a voice gateway 1025. The synchronization controller 1020 further communicates with both the voice gateway 1025 and several components on a device 1030. The device 1030 includes the browser interface 270, a browser 1040, and the voice interface 275. The browser 1040 communicates with the browser interface 270 and the synchronization controller 1020. The voice interface 275 communicates with the synchronization controller 1020.

The web server 1010 is capable of delivering HTML and VXML pages. The device 1030 may be, for example, a computer or portable PDA that is equipped for two modes of interfacing to the WWW. The system 1000 allows the two modes to be synchronized, and the system 1000 does not require the web server 1010 to be enhanced or redesigned because the synchronization controller 1020 is independent and separate from the web server 1010.

Figure 11:
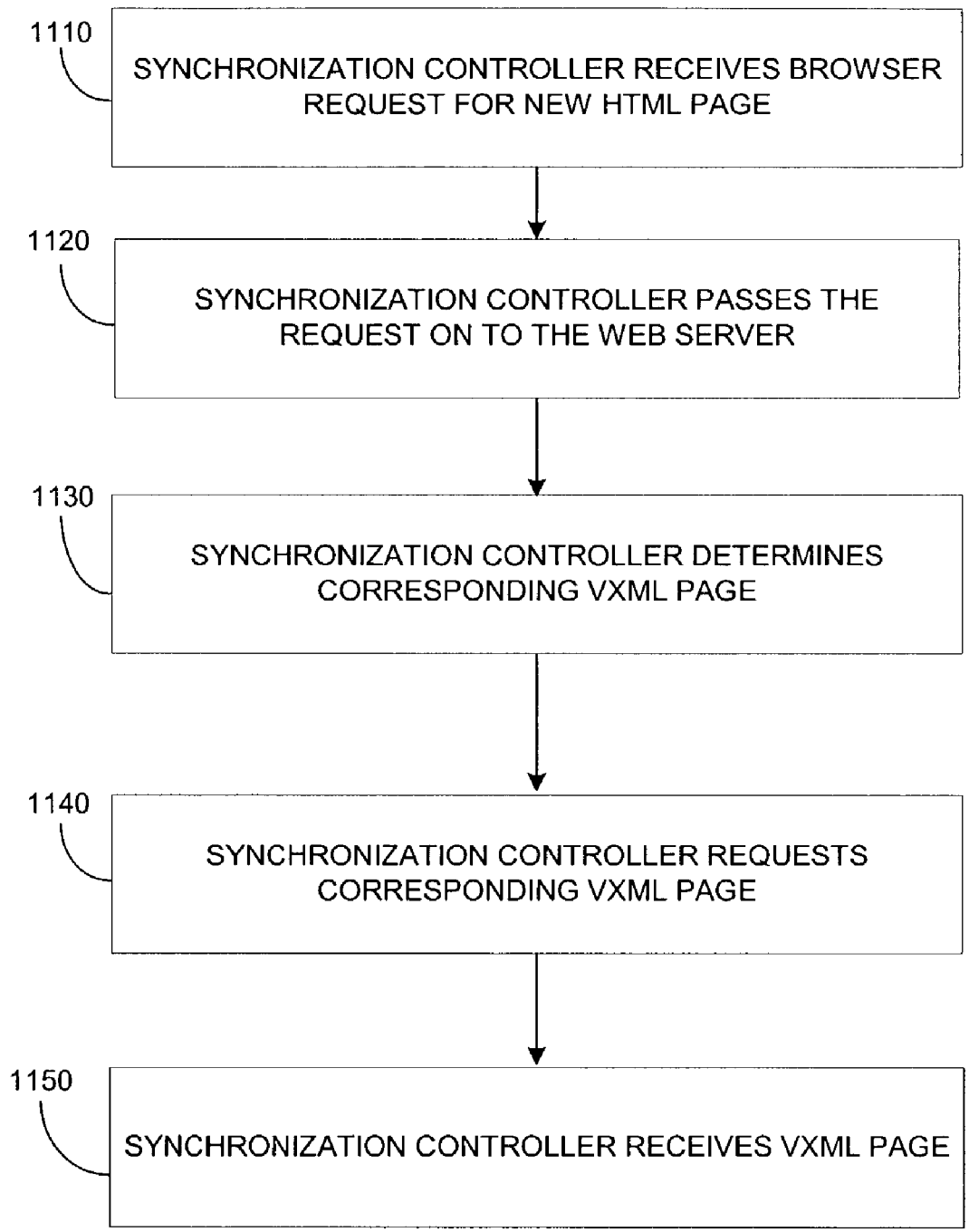
FIG. 11 is an example of a process for synchronizing a browser and a voice mode in the system of FIG. 10 after a browser input.
Figure 12:
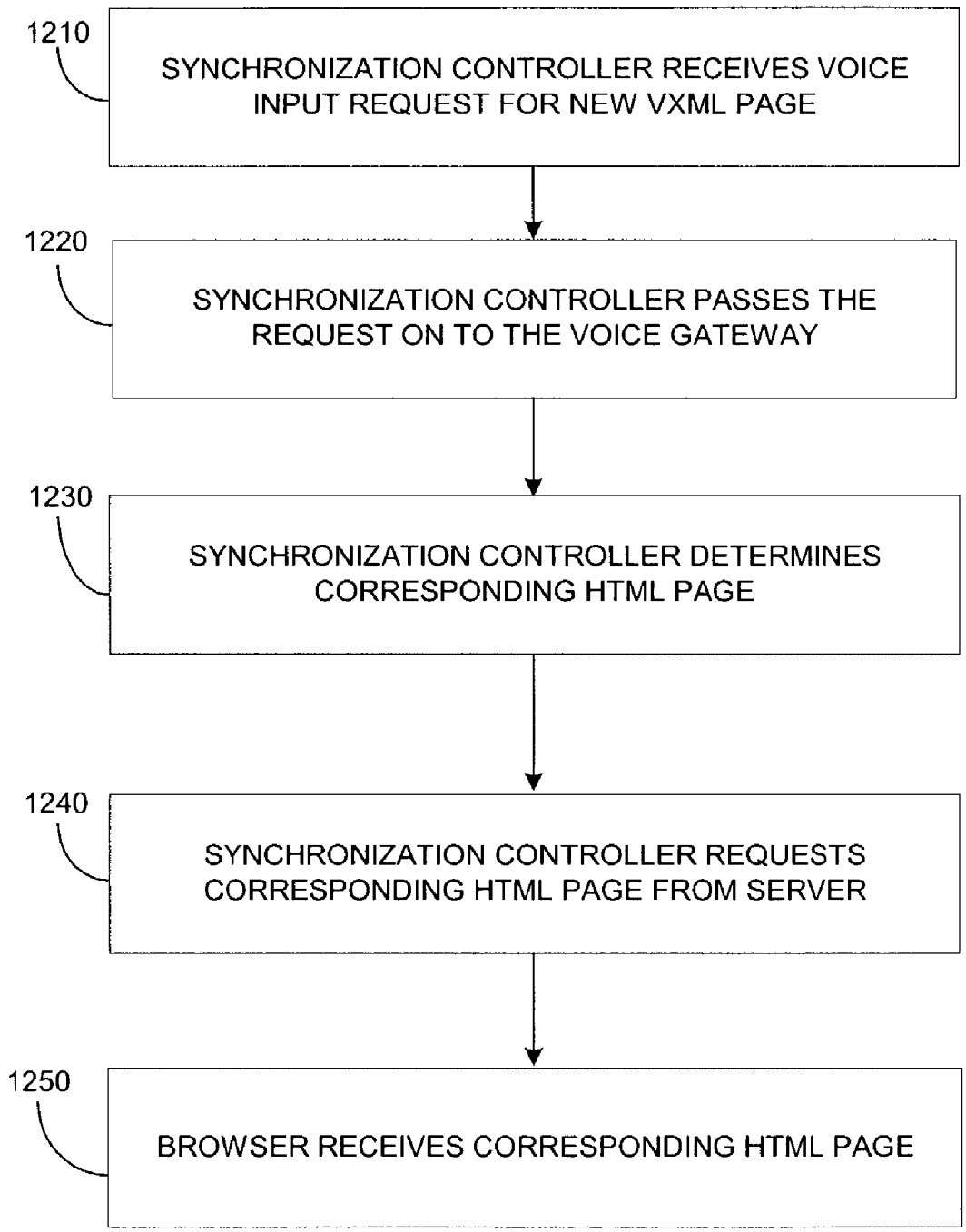
FIG. 12 is an example of a process for synchronizing a browser and a voice mode in the system of FIG. 10 after a voice input.

Referring to FIGS. 11 and 12, two processes are described for synchronizing the browser 1040 and the voice gateway 1025, or alternatively, the browser interface 270 and the voice interface 275. Both assume that the user input is a request for a new page, although other inputs may be used.

Referring to FIG. 11, a process 1100 includes the synchronization controller 1020 receiving a browser request for a new HTML page (1110). The process 1100 includes the synchronization controller 1020 passing the HTML request on to the web server 1010 (1120), and determining the corresponding VXML page (1130). These three operations 1110–1130 are substantially similar to the operations 810, 840, and 820, respectively, except for the location of the synchronization controller (compare 720 with 1120). The synchronization controller 1020 may delay sending the browser request to the web server 1010 (1120) until later in the process 1100 in order, for example, to better time the arrival of the requested HTML page at the browser 1040 with the arrival of the corresponding VXML page at the synchronization controller 1020 (see 1150).

The process 1100 includes the synchronization controller 1020 requesting the corresponding VXML page through the voice gateway 1025 (1140). The synchronization controller 1020 may request the page in various ways. For example, the synchronization controller 1020 may send a simulated voice request to the voice gateway 1025, or send a command to the voice gateway 1025.

The process 1100 includes the synchronization controller 1020 receiving the corresponding VXML page (1150). The voice gateway 1025 receives the requested VXML page and sends it to the synchronization controller 1020. In another implementation, the synchronization controller 1020 does not receive the VXML page, and the voice gateway 1025 does the voice recognition and interfacing with the user with the synchronization controller 1020 acting as a conduit.

Referring to FIG. 12, a process 1200 includes the synchronization controller 1020 receiving a voice input from the voice interface 275 requesting a new VXML page (1210). The process 1200 includes the synchronization controller (i) parsing the voice input and passing the request for a new VXML page along to the voice gateway 1025 (1220), and (ii) determining the corresponding HTML page (1230). In this implementation, the synchronization controller 1020 has access to and stores the current VXML page, which allows the synchronization controller 1020 to parse the voice input. As explained above, having the current VXML page may also allow the synchronization controller 1020 to determine the corresponding HTML page for "voice click" events. If the user's input is not the voice equivalent of clicking on a link, but is, for example, a spoken URL, then by having the capability to do the voice recognition, the synchronization controller may be able to parse the URL and request that the server provide the URL for the corresponding HTML page.

The process 1200 includes the synchronization controller 1020 requesting the corresponding HTML page from the server (1240), and the browser receiving the requested HTML page (1250). In another implementation, the synchronization controller 1020 does not determine the corresponding page, but requests that the web server 1010 determine the corresponding page and send the corresponding page.

In yet another implementation, the synchronization controller 1020 does not parse the voice input, but merely passes the VoIP request along to the voice gateway 1025. If the voice input is a request for a VXML page, the voice gateway 1025 determines the corresponding HTML page and provides the synchronization controller 1020 with a URL for the HTML page.

Figure 13:
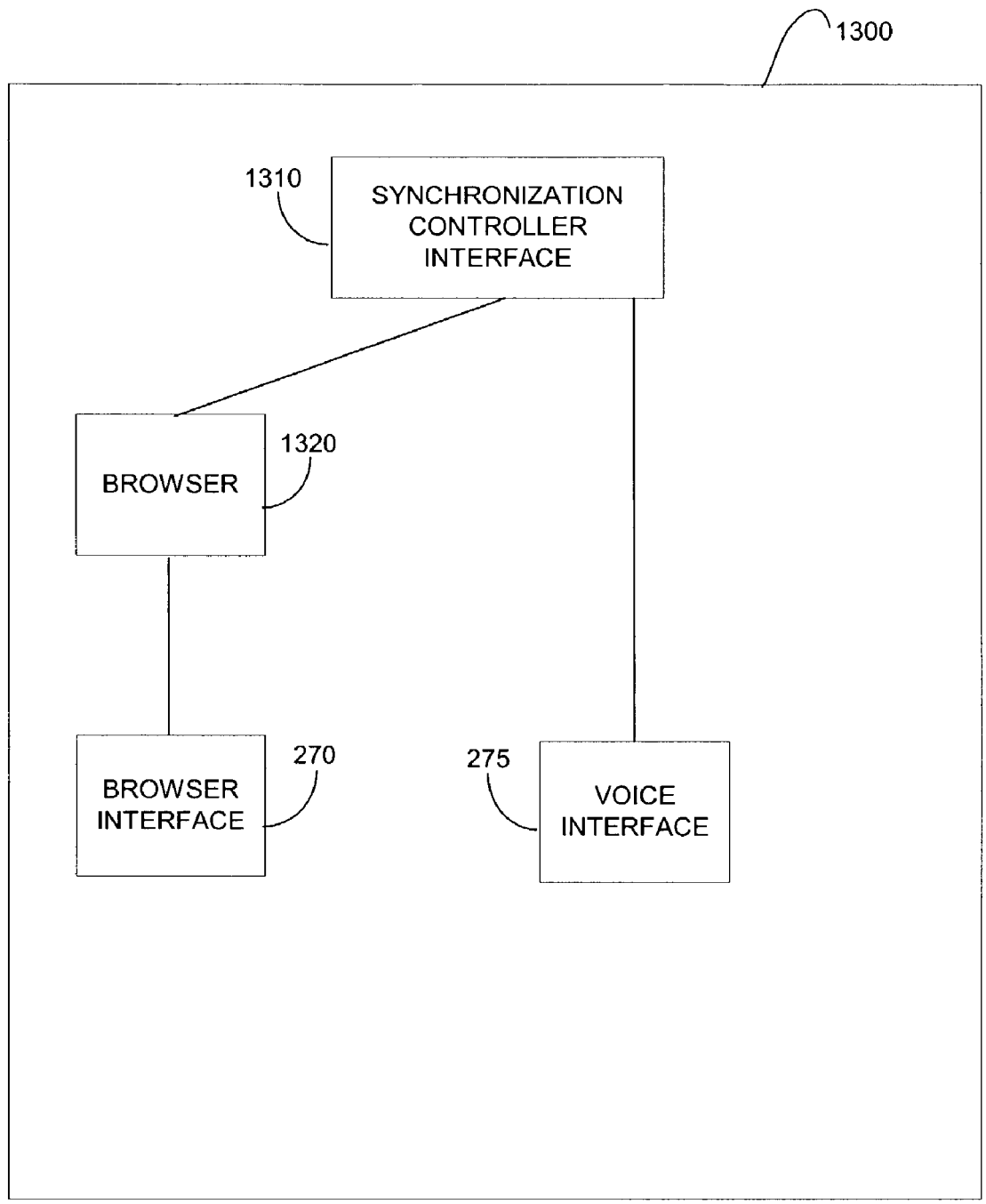
FIG. 13 is an example of a device for communicating with a synchronization controller in a proxy system for synchronizing multiple modes.

Referring to FIG. 13, a device 1300 includes a synchronization controller interface 1310, a browser 1320, the browser interface 270, and the voice interface 275. The browser 1320 communicates with the browser interface 270 and the synchronization controller interface 1310. The synchronization controller interface 1310 further communicates with the voice interface 275. The device 1300 is similar to the device 1030 except that the functionality allowing the browser 1040 and the voice interface 275 to communicate with the synchronization controller 1020 is separated as the synchronization controller interface 1310. In one implementation, the device 1300 is a mobile device. Such a mobile device is smaller and lighter than if a synchronization controller was also implemented on the mobile device. Further, because such a mobile device does not contain the functionality of a synchronization controller, but only includes an interface, the mobile device may be able to take advantage of improvements in a synchronization controller without having to be redesigned.

Additional Variations

Each of the above implementations may be used with more than two different modes. For example, inventory, shipping, or other data may be accessed in a warehouse using three different modes, and one or more machines accessing the warehouse data may need to be synchronized. The first mode may include keyboard input. The second may include voice input. And the third may include input from scanning a bar code on a pallet, for example, to request a particular record. Output for any of the modes may include, for example, display output, voice output, or printer output.

The processes described have been principally explained in terms of a particular system. However, each of the processes may be used with a variety of other implementations of a centralized, fused, proxy, or other type of system.

Referring again to FIG. 1, the server system 110 includes one or more devices for storing, at least temporarily, information that can be accessed by one or more gateways. For example, a web server has a storage device for storing web pages. The server system 110 may include multiple storage devices that are located locally or remotely with respect to each other. The server system 110 may include one or more storage devices that are located locally to another component, such as, for example, the device 160 or the second gateway 185. In various implementations, the server system 110 or the synchronization controller 120 are not contained in the unit 140.

The synchronization controller 120 maintains or establishes synchronization between two or more devices, such as, for example, gateways and/or interfaces. The components of the synchronization controller 120 may be remote or local with respect to each other and may be local to one or more of the other components in the system 100 such as, for example, the device 160, the second gateway 185, or the publish/subscribe system 150.

The publish/subscribe system 150 refers to a system that receives and sends messages. In particular implementations, the publish/subscribe system 150 can only receive messages from, or send messages to, subscribed entities—with the exception of receiving a subscribe request.

The device 160 may be an electronic device, an optical device, a magnetic device, or some other type of device capable of communicating with a user and with other systems. Examples include a computer, a PDA, a server, or a set-top box.

The connections 130, 180, 190, 194, 196, and other connections throughout the disclosure, may be direct or indirect connections, possibly with one or more intervening devices. A connection may use one or more media such as, for example, a wired, a wireless, a cable, or a satellite connection. A connection may use a variety of technologies or standards such as, for example, analog or digital technologies, packet switching, code division multiple access ("CDMA"), time division multiple access ("TDMA"), and global system for mobiles ("GSM") with general packet radio service ("GPRS"). A connection may use a variety of established networks such as, for example, the Internet, the WWW, a wide-area network ("WAN"), a local-area network ("LAN"), a telephone network, a radio network, a television network, a cable network, and a satellite network.

The processes 300–600 are amenable to numerous variations, several examples of which follow, and may be applied to architectures different than that of the system 200. Separate devices, each including one gateway, can be synchronized by keeping track of the IP addresses and port numbers of the separate devices, or by having the devices subscribe to the same topic at a publish/subscribe system. For example, a user may be operating a first-modality interface on a first machine, and operating a second-modality interface on a second machine. As another example, two or more users may be remotely located and may want to be synchronized. The remotely located users may be operating the same modality interface, or different modality interfaces.

The voice command discussed as initiating operation 320 or 410, and the browser commands discussed as initiating operation 520 or 620, may be a navigation command or a non-navigation command. Navigation commands include, for example, specifying a URL, and entering a home, back, or forward command. Non-navigation commands include, for example, a text entry, a preference change, or a focus command.

Any input received by a gateway, including command and data, may be provided to the server by the voice gateway or browser. For example, the voice gateway may provide the server with text entries and other inputs, even when the voice gateway does not need a VXML page, so that the server can supply the input to the browser to keep the browser synchronized with respect to text entries, etc., and not just with respect to new pages.

In various implementations, the server's message to a gateway in operation 360, 460, or 560 may include, for example, (i) the actual corresponding HTML/VXML page, (ii) the URL of the corresponding page with a command to retrieve the corresponding page, (iii) the URL of a JSP that identifies the corresponding page, (iv) a command relating to the corresponding page or to a JSP that identifies the corresponding page, and (v) an indication to reload the current page, into which the server has embedded a command that will retrieve the corresponding page.

A first item is said to relate to a first data when the first item includes information relating to the first data. Such information may include, for example, the first data itself, an address of the first data or some other pointer to the first data, an encoding of the first data, and parameters identifying particular information from the first data. The first data may include any of the many examples described in this disclosure as well as, for example, an address of some other data, data entered by a user, and a command entered by a user.

In sending the corresponding input, or an indication of the corresponding input, to a gateway (340-50, 450, 540-550, 660), a server may send, for example, a command or parameters. A command may include, for example, a JavaScript command that requests the corresponding page. Parameters may include, for example, a URL of the corresponding page. The parameters are parsed, a command is determined, and the command is executed. For example, in operation 660, instead of sending the corresponding VXML page, the server may send a message with parameters including a URL (for the corresponding VXML page) and an indication that the voice gateway should request the page identified by the URL.

In the processes 300–600, the web server 240 is described as performing a variety of actions. As described earlier, the web server 240 includes a synchronization controller and many of the actions performed by the web server 240 can be characterized as being performed by a synchronization controller.

Referring to FIGS. 8 and 9, operations 810 and 910 may be generalized to allow the synchronization controller 720 to receive other browser inputs, and the voice mode system 740 to receive other voice inputs. The inputs may include, for example, a command, a request for a new page, a data input, and a focus request. In one implementation of operation 910, the voice mode system 740 receives a user's city selection for a field in a VXML page that solicits the user's address. Receipt of the city selection causes the VXML to move to the dialogue entry for selecting a state. The voice mode system 740 may pass this selection to the browser 735 so that the user's screen display can be updated.

Further, the voice mode system 740 may be a voice gateway. In such an implementation, the voice gateway would not have any VXML pages stored locally and would request them from the web server 710. The synchronization controller 720 may intercept or control the voice gateway requests, analogous to the manner in which the synchronization controller 720 may intercept or control the browser requests.

One or more of the functions of the synchronization controller 720 may be performed by either the browser 735 or the voice mode system 740. For example, the browser 735 may send HTML page requests to the voice mode system 740, and the voice mode system 740 may determine the corresponding VXML page.

As indicated by the breadth of implementations disclosed, the synchronization controller can be placed at various locations within a system. Further, the component functions of a synchronization controller can be separated and placed at different locations within a system. This flexibility allows the complexity of a system to be targeted to one or more particular devices. By keeping the synchronization controller functions off of a mobile device, for example, mobile devices may be more lightweight, less expensive, and more robust to technology enhancements in the synchronization controller. By using a proxy model, a mobile device is still free of the synchronization controller, so the previous benefits may be enjoyed. Further, by using a proxy model, the multitude of existing web servers may not need to be redesigned, and the synchronization controller may allow multiple types of mobile devices to communicate with the same server infrastructure. Using a publish/subscribe system, operating as in the implementations described or according to other principles, may also facilitate an architecture with minimal install time for client devices, such that client devices are changed as little as possible.

A synchronization controller may consist of one or more components adapted to perform, for example, the functions described for a synchronization controller in one or more of the implementations in this disclosure. The components may be, for example, hardware, software, firmware, or some combination. Hardware components include, for example, controller chips and chip sets, communications chips, digital logic, and other digital or analog circuitry.

The implementations disclosed can be characterized as providing a synchronizing mechanism. Such synchronizing mechanisms include, for example, (i) sending a message to a publish/subscribe system, (ii) sending a message to a browser, possibly with a URL for a new page or a JSP, (iii) updating state information by, for example, updating a JSP, (iv) sending a corresponding page directly to a gateway, (v) requesting a corresponding page from an intermediary or from a storage location having the page, (vi) determining a corresponding page, and (vii) requesting a determination of a corresponding page, and possibly requesting receipt of that determination. Various of the listed mechanisms may be performed by a synchronization controller, a web server, a gateway, or another component adapted to provide such functionality.

Many of the disclosed implementations have focused on WWW and Internet applications. However, the features described can be applied to a variety of communication environments, networks, and systems. The use of the term "page," is also not meant to be restrictive and refers to data in a form usable by a particular gateway, interface, or other component.

Throughout this disclosure various actions are described, such as, for example, receiving, accessing, providing, sending, requesting, determining, passing, and routing. These terms, and others like them, are intended to be broadly construed. Accordingly, such terms are not restricted to acting directly but may act through one or more intermediaries. For example, a page may be sent to a gateway, provided to a gateway, or received from a gateway, even though the page may first go through a controller or a publish/subscribe system. As another example, a corresponding page may be determined by requesting another component to provide the corresponding URL.

Section II

A user interface may allow a user to gain access to data, such as, for example, products in a catalog database, or to enter data into a system, such as, for example, entering customer information into a customer database. User interfaces are used for applications residing on relatively stationary computing devices, such as desktop computers, as well as for applications residing on mobile computing devices, such as laptops, palmtops, and portable electronic organizers. A voice-activated user interface can be created to provide data access and entry to a system, and voice input may be particularly appealing for mobile devices.

In various implementations, a grammar for speech recognition for a given voice-driven application, mobile or otherwise, can be written to enable accurate and efficient recognition. Particular implementations described below provide a user interface that allows a user to input data in one or more of a variety of different modes, including, for example, stylus and voice input. Output may also be in one or more of a variety of modes, such as, for example, display or voice. Particular implementations may be used with mobile devices, such as, for example, palmtops, and the combination of voice and stylus input with voice and display output may allow such mobile devices to be more useful to a user. Implementations may also be used with the multi-modal synchronization system described in the incorporated provisional application.

Implementations allow enhanced voice recognition accuracy and/or speed due in part to the use of a structured grammar that allows a grammar to be narrowed to a relevant part for a particular voice recognition operation. For example, narrowing of the grammar for a voice recognition operation on a full search string may be achieved by using the results of an earlier, or parallel, voice recognition operation on a component of the full search string. Other implementations may narrow the grammar by accepting parameters of a search string in a particular order from a user, and, optionally, using the initial parameter(s) to narrow the grammar for subsequent parameters. Examples include (i) reversing the standard order of receiving street address information so that, for example, the country is received before the state and the grammar used to recognize the state is narrowed to the states in the selected country, (ii) segmenting an electronic mail address or web site address so that a user supplies a domain identifier, such as, for example "com," separately, or (iii) automatically inserting the "at sign" and the "dot" into an electronic mail address and only prompting the user for the remaining terms, thus obviating the often complex process of recognizing these spoken characters.

Implementations may also increase recognition accuracy and speed by augmenting a grammar with possible search strings, or utterances, thus decreasing the likelihood that a voice recognition system will need to identify an entry by its spelling. In such situations, the voice recognition system also obviates the need to ask the user to spell out a term that is not recognized when spoken. For example, after a user enters "com" as a domain identifier in an electronic mail address, the voice recognition system may include, for example, the names of all "Fortune 100" companies and a variety of popular commercial sites in the grammar for the server identifier of the electronic mail address. Thus, if the user then enters "amazon" as the server identifier, and if "amazon" has been included in the grammar, the system will recognize the entry without having to ask the user to spell it out.

Implementations also allow enhanced database searching. This may be achieved, for example, by using a structured grammar and associating grammar entries with specific database entries. In this manner, when the structured grammar is used to recognize the search string, then particular database entries or relevant portions of the database may be identified at the same time.

According to one general aspect, automatically searching for one or more matches to a search string includes accessing a first part and a second part of a search string. A first search space is searched for a match for the first part of the search string, and a second search space is limited based on a result of searching the first search space. The limited second search space is searched for a match for the second part of the search string.

Searching the first search space may include searching a database. Searching the limited second search space may include searching at least part of the database. Limiting the second search space may include limiting the part of the database that is searched to database entries that include a match for the first part of the search string, thus allowing a quicker search compared to searching the full database. The second part of the search string may include a voice input or a manual input. Searching the first search space and searching the limited second search space may be performed at least partially in parallel. The search string may include an address.

Accessing the first part of the search string may include accessing a voice input. Searching the first search space for the match may include performing voice recognition on the first part of the search string. Accessing at least the second part of the search string may include accessing the voice input. Limiting the second search space may include limiting the second search space to grammar entries associated with the first part of the search string. Searching the limited second search space may include performing voice recognition on at least the second part of the search string using the limited second search space, thereby allowing enhanced voice recognition of the second part of the search string compared to performing voice recognition using the unlimited second search space.

The grammar entries associated with the first part of the search string may include grammar entries for full search strings, each full search string including the first part of the search string. The grammar entries associated with the first part of the search string may include grammar entries for components of a full search string, each component being part of a full search string that includes the first part. Performing voice recognition on the first part may produce a recognized string, and the recognized string may be associated with a set of recognizable search strings from the search space. Limiting the second search space may include limiting the second search space to the set of recognizable search strings or components thereof. Performing voice recognition on the second part of the voice input may include comparing the second part to a set of high-occurrence patterns in the limited second search space, followed by comparing the second part to a set of low-occurrence patterns in the limited second search space. Voice recognition may be performed on the entire voice input using a third search space. The third search space may be limited based on the result from performing voice recognition on the first part of the voice input and based on a result from performing voice recognition on at least the second part of the voice input.

The first part of the search string may be associated with a set of searchable entries, and each entry in the limited second search space may be associated with one or more entries in the set of searchable entries. A first set of options may be provided to a user, the first set of options relating to the first part of the search string, and being provided to the user in a page. Accessing at least the first part of the search string may include accepting a first input from the user, the first input being selected from the first set of options. Limiting the second search space may include limiting a second set of options based on the accepted first input, the second set of options relating to the second part of the search string. The second set of options may be provided to the user in the page, such that the user is presented with a single page that provides the first set of options and the second set of options. Accessing at least the second part of the search string may include accepting a second input from the user, the second input being selected from the second set of options.

Accepting the first input may include accepting a first voice input and performing voice recognition on the first input, wherein performing voice recognition on the first input in isolation allows enhanced voice recognition compared to performing voice recognition on the search string. The first set of options may include manufacturer designations and the second set of options may include product designations from a manufacturer designated by the first input. The search string may include an address.

Accepting the first input may include receiving the first input auditorily from the user. Voice recognition may be performed on the first input in isolation, wherein performing voice recognition on the first input in isolation allows enhanced voice recognition compared to performing voice recognition on the search string. Providing the second set of options may include searching a set of data items for the first input and including in the second set of options references only to those data items, from the set of data items, that include the first input. Accepting the second input may include receiving the second input auditorily from the user. Voice recognition may be performed on the second input in isolation, wherein performing voice recognition on the second input in isolation allows enhanced voice recognition compared to performing voice recognition on the search string.

A third set of options may be provided to the user, the third set of options relating to a third part of the search string and being provided to the user in the page. A third input may be accepted from the user, the third input being selected from the third set of options, wherein the second set of options that is provided to the user is also based on the accepted third input. The second set of options may be modified based on the third input. The first set of options may include manufacturer designations. The third set of options may include price range designations. The second set of options may include product designations from a manufacturer designated by the first input in a price range designated by the third input.

In various implementations, a grammar for speech recognition for a given voice-driven application, mobile or otherwise, can be written to enable accurate and efficient recognition. Particular implementations described below provide a user interface that allows a user to input data in one or more of a variety of different modes, including, for example, stylus and voice input. Output may also be in one or more of a variety of modes, such as, for example, display or voice. Particular implementations may be used with mobile devices, such as, for example, palmtops, and the combination of voice and stylus input with voice and display output may allow such mobile devices to be more useful to a user. Implementations may also be used with the multimodal synchronization system described in the incorporated provisional application.

Implementations allow enhanced voice recognition accuracy and/or speed due in part to the use of a structured grammar that allows a grammar to be narrowed to a relevant part for a particular voice recognition operation. For example, narrowing of the grammar for a voice recognition operation on a full search string may be achieved by using the results of an earlier, or parallel, voice recognition operation on a component of the full search string. Other implementations may narrow the grammar by accepting parameters of a search string in a particular order from a user, and, optionally, using the initial parameter(s) to narrow the grammar for subsequent parameters. Examples include (i) reversing the standard order of receiving street address information so that, for example, the country is received before the state and the grammar used to recognize the state is narrowed to the states in the selected country, (ii) segmenting an electronic mail address or web site address so that a user supplies a domain identifier, such as, for example "com," separately, or (iii) automatically inserting the "at sign" and the "dot" into an electronic mail address and only prompting the user for the remaining terms, thus obviating the often complex process of recognizing these spoken characters.

Implementations may also increase recognition accuracy and speed by augmenting a grammar with possible search strings, or utterances, thus decreasing the likelihood that a voice recognition system will need to identify an entry by its spelling. In such situations, the voice recognition system also obviates the need to ask the user to spell out a term that is not recognized when spoken. For example, after a user enters "com" as a domain identifier in an electronic mail address, the voice recognition system may include, for example, the names of all "Fortune 100" companies and a variety of popular commercial sites in the grammar for the server identifier of the electronic mail address. Thus, if the user then enters "amazon" as the server identifier, and if "amazon" has been included in the grammar, the system will recognize the entry without having to ask the user to spell it out.

Implementations also allow enhanced database searching. This may be achieved, for example, by using a structured grammar and associating grammar entries with specific database entries. In this manner, when the structured grammar is used to recognize the search string, then particular database entries or relevant portions of the database may be identified at the same time.

According to one general aspect, performing voice recognition includes accessing a voice input including at least a first part and a second part, performing voice recognition on the first part of the voice input, performing voice recognition on a combination of the first part and the second part using a search space, and limiting the search space based on a result from performing voice recognition on the first part of the voice input. Limiting the search space allows enhanced voice recognition of the combination compared to performing voice recognition on the unlimited search space.

Performing voice recognition on the first part may produce a recognized string, and the recognized string may be associated with a set of recognizable utterances from the search space. Limiting the search space may include limiting the search space to a set of recognizable utterances. Voice recognition on the first part may be performed in parallel with voice recognition on the combination, such that the search space is not limited until after voice recognition on the combination has begun. Voice recognition on the first part may be performed before voice recognition on the combination, such that the search space is limited before voice recognition on the combination has begun. Performing voice recognition on the first part of the voice input may include comparing the first part to a set of high-occurrence patterns in the search space, followed by comparing the first part to a set of low-occurrence patterns in the search space.

Performing voice recognition on the first part of the voice input may include using a second search space. Voice recognition may be performed on the second part of the voice input. The second search space may be limited based on a result from performing voice recognition on the second part of the voice input. Limiting the search space may also be based on the result from performing voice recognition on the second part of the voice input.

Accessing circuitry may be used to access a voice input including at least a first part and a second part. Recognition circuitry may be used to perform voice recognition on the first part of the voice input and on the combination of the first part and the second part, wherein voice recognition may be performed on the combination using a search space. A recognition engine may be used and may include the recognition circuitry. Limiting circuitry may be used to limit the search space based on a result from performing voice recognition on the first part of the voice input. Limiting the search space may allow enhanced voice recognition of the voice input compared to performing voice recognition on the unlimited search space.

One or more of the accessing circuitry, the recognition circuitry, and the limiting circuitry may include a memory with instructions for performing one or more of the operations of accessing the voice input, performing voice recognition, and limiting the search space based on the result from performing voice recognition on the first part of the voice input. One or more of the accessing circuitry, the recognition circuitry, and the limiting circuitry may include a processor to perform one or more of the operations of accessing the voice input, performing voice recognition, and limiting the search space based on the result from performing voice recognition on the first part of the voice input. The circuitry may be used to perform one of the other features described for this or another aspect.

According to another general aspect, accepting input from a user includes providing a first set of options to a user, the first set of options relating to a first parameter of a search string, and being provided to the user in a page. A first input is accepted from the user, the first input being selected from the first set of options. A second set of options is limited based on the accepted first input, the second set of options relating to a second parameter of the search string. The second set of options is provided to the user in the page, such that the user is presented with a single page that provides the first set of options and the second set of options.

Accepting the first input from the user may include receiving an auditory input and performing voice recognition. Performing voice recognition on the first input in isolation may allow enhanced voice recognition compared to performing voice recognition on the search string. Accepting the first input from the user may include receiving a digital input.

A second input may be accepted from the user, the second input being selected from the second set of options. Accepting the first input may include receiving the first input auditorily from the user. Voice recognition may be performed on the first input in isolation. Performing voice recognition on the first input in isolation may allow enhanced voice recognition compared to performing voice recognition on the search string. Providing the second set of options may include searching a set of data items for the first input and including in the second set of options references only to those data items that include the first input. Accepting the second input may include receiving the second input auditorily from the user. Voice recognition may be performed on the second input in isolation. Performing voice recognition on the second input in isolation may allow enhanced voice recognition compared to performing voice recognition on the search string.

A third set of options may be provided to the user, and the third set of options may relate to a third parameter of the search string and be provided to the user in the page. A third input may be accepted from the user, and the third input may be selected from the third set of options. The second set of options provided to the user may also be based on the accepted third input. The second set of options provided to the user may be modified based on the accepted third input.

Providing the second set of options may include searching a set of data for the first input and providing only data items from the set of data that include the first input. The first input may include a manufacturer designation that identifies a manufacturer. Providing the second set of options may be limited to providing only data items manufactured by the identified manufacturer.

Circuitry may be used (i) to provide a first set of options to a user, the first set of options relating to a first parameter of a search string, and being provided to the user in a page, (ii) to accept a first input from the user, the first input being selected from the first set of options, (iii) to limit a second set of options based on the accepted first input, the second set of options relating to a second parameter of the search string, and/or (iv) to provide the second set of options to the user in the page, such that the user is presented with a single page that provides the first set of options and the second set of options. The circuitry may include a memory having instructions stored thereon that when executed by a machine result in at least one of the enumerated operations being performed. The circuitry may include a processor operable to perform at least one of the enumerated operations. The circuitry may be used to perform one of the other features described for this or another aspect.

According to another general aspect, receiving items of an address from a user includes providing the user a first set of options for a first item of an address, receiving from the user the first address item taken from the first set of options, limiting a second set of options for a second item of the address based on the received first item, providing the user the limited second set of options for the second address item, and receiving the second address item.

Receiving the first address item may include receiving the first address item auditorily. Recognition may be performed on the received first address item. Performing voice recognition on the first address item in isolation may allow enhanced voice recognition compared to performing voice recognition on the address. Receiving the second address item may include receiving the second address item auditorily. Recognition may be performed on the received second address item. Performing voice recognition on the second address item in isolation may allow enhanced voice recognition compared to performing voice recognition on a combination of the first address item and the second address item or on the address.

The first address item may include a state identifier. The second address item may include a city identifier identifying a city. The user may be provided a third list of options for a zip code identifier. The third list of options may exclude a zip code not in the identified city. The zip code identifier may be received auditorily from the user. The user may select the zip code identifier from the third list of options. The zip code identifier may identify a zip code. Voice recognition may be performed on the auditorily received zip code identifier. Excluding a zip code in the third list of options may allow enhanced voice recognition compared to not excluding a zip code. The user may be provided a fourth list of options for a street address identifier. The fourth list of options may exclude a street not in the identified zip code. The street address identifier may be received auditorily from the user. The user may select the street address identifier from the fourth list of options. The street address identifier may identify a street address. Voice recognition may be performed on the auditorily received street address identifier. Exclusion of a street in the fourth list of options may allow enhanced voice recognition compared to not excluding a street.

Providing the user the first list of options may include providing the first list on a display. Providing the user the second list of options may include providing the second list auditorily.

Circuitry may be used (i) to provide the user a first set of options for a first item of an address, (ii) to receive from the user the first address item taken from the first set of options, (iii) to limit a second set of options for a second item of the address based on the received first item, (iv) to provide the user the limited second set of options for the second address item, and/or (v) to receive the second address item. The circuitry may include a memory having instructions stored thereon that when executed by a machine result in at least one of the enumerated operations being performed. The circuitry may include a processor operable to perform at least one of the enumerated operations. The circuitry may be used to perform one of the other features described for this or another aspect.

According to another general aspect, receiving an Internet address from a user includes prompting a user for a first portion of an Internet address. The first portion of the Internet address is received auditorily from the user. Voice recognition is performed on the received first portion. Performing voice recognition on only the first portion of the Internet address allows enhanced recognition compared to performing voice recognition on more than the first portion of the Internet address. The user is prompted for a second portion of the Internet address. The second portion of the Internet address is received auditorily from the user. Voice recognition is performed on the received second portion. Performing voice recognition on only the second portion of the Internet address allows enhanced recognition compared to performing voice recognition on more than the second portion of the Internet address.

The Internet address may include an electronic mail address. The first portion may include a domain identifier of an electronic mail address. The second portion may include a server identifier of an electronic mail address. The user may be prompted for a user identifier portion of an electronic mail address. A user identifier portion may be received auditorily from the user. Voice recognition may be performed on a received user identifier portion. Performing voice recognition on only a user identifier portion may allow enhanced recognition compared to performing voice recognition on more than the user identifier portion of an electronic mail address.

Performing voice recognition on a domain identifier may include using a domain vocabulary including common threeletter domain identifiers, which may allow enhanced recognition. Performing voice recognition on a server identifier may include using a server vocabulary including common server identifiers, which may allow enhanced recognition. Performing voice recognition on a user identifier may include using a user vocabulary including common user identifiers, which may allow enhanced recognition. The server vocabulary may be based on a domain identifier.

The Internet address may include a web site address. The first portion may include a domain identifier of the web site address. The second portion may include a server identifier of the web site address. The user may be prompted for a network identifier portion of the web site address. The network identifier portion may be received auditorily from the user. Voice recognition may be performed on the received network identifier portion. Performing voice recognition on only the network identifier portion may allow enhanced recognition compared to performing voice recognition on more than the network identifier portion of the web site address.

Circuitry may be used (i) to prompt a user for a first portion of an Internet address, (ii) to receive auditorily from the user the first portion of the Internet address, (iii) to perform voice recognition on the received first portion, wherein performing voice recognition on only the first portion of the Internet address allows enhanced recognition compared to performing voice recognition on more than the first portion of the Internet address, (iv) to prompt the user for a second portion of the Internet address, (v) to receive auditorily from the user the second portion of the Internet address; and/or (vi) to perform voice recognition on the received second portion, wherein performing voice recognition on only the second portion of the Internet address allows enhanced recognition compared to performing voice recognition on more than the second portion of the Internet address. The circuitry may include a memory having instructions stored thereon that when executed by a machine result in at least one of the enumerated operations being performed. The circuitry may include a processor operable to perform at least one of the enumerated operations. The circuitry may be used to perform one of the other features described for this or another aspect.

Various implementations include a user interface that provides a user with access to data. These user interfaces may be designed to accept various modes of input and to deliver various modes of output. Examples of input and output modes include manual, visual (for example, display or print), auditory (for example, voice or alarms), haptic, pressure, temperature, and smell. Manual modes may include, for example, keyboard, stylus, keypad, button, mouse, touch (for example, touch screen), and other hand inputs. Certain implementations are particularly suited for mobile applications, for which stylus or voice input is preferred, and for which output is presented visually on the screen and/or auditorily with text-to-speech or recorded human speech.

Various implementations also make use of structured grammars for voice recognition. The structured grammars may allow for quicker recognition, for quicker searching for an item in a corresponding database, and/or for enhanced voice recognition due to the decreased likelihood of misrecognizing a voice input.

Figure 14:
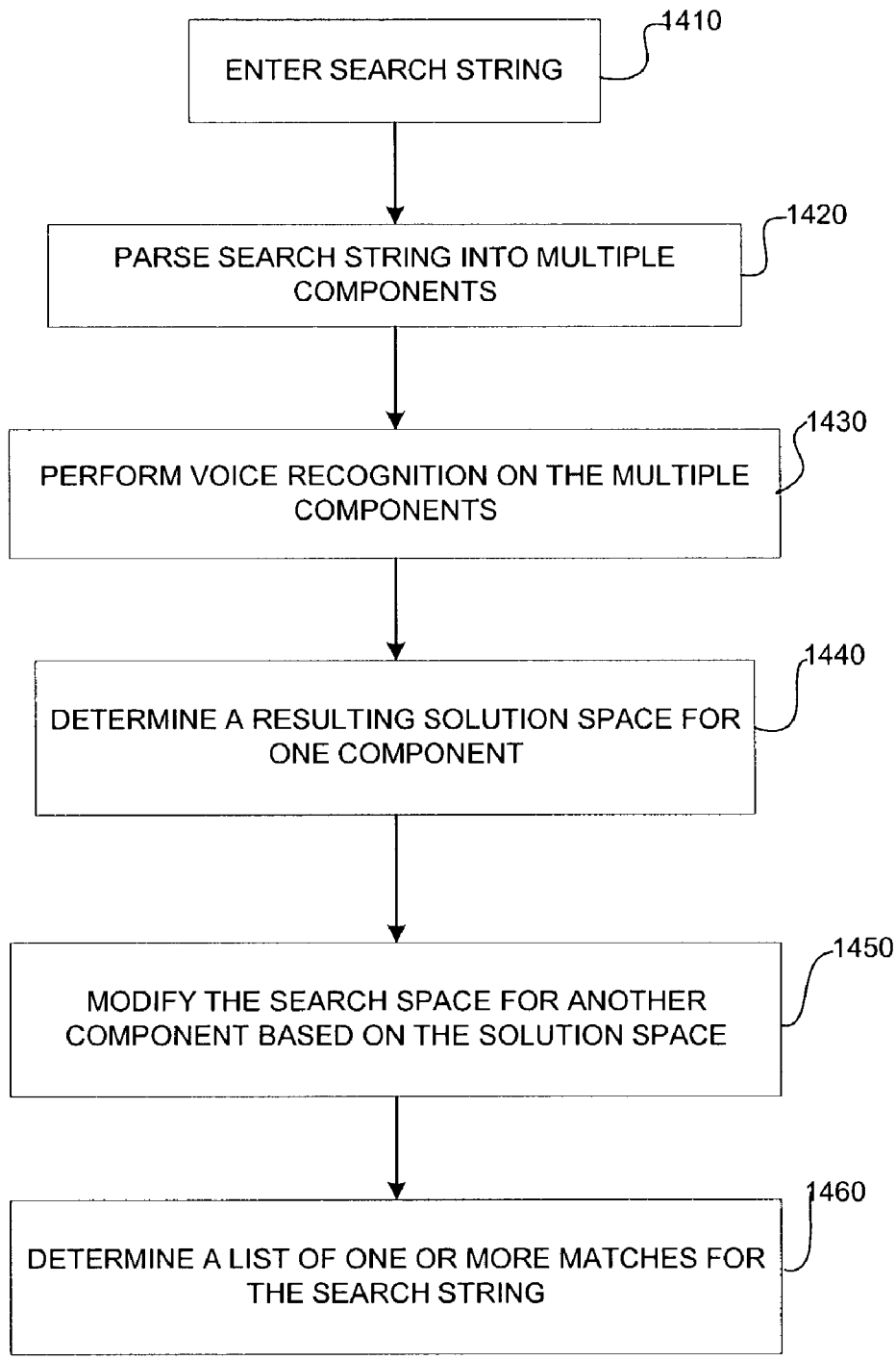
FIG. 14 is a flow chart of a process for recognizing a search string using a multi-cluster approach.

Referring to FIG. 14, a process 1400 for recognizing a search string using a multi-cluster approach includes entering a search string using a voice input (1410). The search string may represent, for example, an item in a database that a user wants to find. For example, the user may enter "Sony laptop superslim 505Z" into a voice recognition engine of a computer database to pull up information on that (hypothetical) computer model. As explained, the grammar is structured around the database entries, including the actual database entries, or keywords, etc., and possibly also including additional category descriptions and other vocabulary entries.

The process 1400 includes parsing the entered search string into at least one component in addition to the full search string (1420). The full search string is also referred to as a component. A component may be a word or other recognized symbol, or group of words or symbols. The search string may be parsed into all of its components, or a single component may be parsed out. Parsing may be performed by recognizing silence between words, symbols, or other components, and the voice entry system may require such silence. Parsing may also be performed on voice inputs entered in a more natural delivery, without obvious pauses between components.

The process 1400 includes performing voice recognition on at least two components (1430). The parsing (1420) may be performed simultaneously while performing the voice recognition (1430). For example, as the search string is processed from left to right, for example, a component may be recognized (1430) and, upon recognition, may be parsed (1420). One of the two components may be the full search string.

The process 1400 includes determining a resulting solution space in the grammar for at least one of the voice recognition operations (1440). The solution space represents possible matches for the full search string. For example, the first component may be the first word of the search string, for example, "Sony," and may correspond to a cluster in the speech recognition grammar. This cluster defined by "Sony" may contain, perhaps, only one hundred entries out of tens of thousands of entries in the grammar (and the corresponding database). Those one hundred entries would form the solution space for the component "Sony."

The process 1400 includes modifying the search space for the voice recognition operation (1430) of at least one of the components using the solution space determined in operation 1440 (1450). Continuing with the example from above, if the full search string is "Sony laptop superslim 505Z," then the search space being used to perform the voice recognition on the full string can be narrowed to include only the one hundred grammar entries that include the component "Sony."

By narrowing the search space, one or more advantages may be realized in particular implementations. For example, by narrowing the search space, the complexity of the searched-grammar, and the size of the searched vocabulary may be reduced, which may enhance recognition accuracy. Further, the speed of the recognition process may be increased.

In one implementation, both recognition processes (1430) are performed at least partially in parallel and recognizing the smaller component, such as "Sony," is faster than recognizing the entire search string. As a result, the recognition process for the full search string is started on the entire search space of grammar entries and is narrowed after the resulting solution space for the smaller component is determined in operation 1440. Other implementations perform the voice recognition processes serially. For example, one implementation performs voice recognition on a smaller component, and afterwards performs voice recognition for a larger component using the smaller component's solution space as the search space for the larger component.

The process 1400 includes determining a list of one or more matches for the full search string (1460). Voice recognition algorithms often return confidence scores associated with the results. These confidence scores can be used, for example, to rank order the results and a selected number of the highest scoring results can be returned to the user.

The list of matches might not necessarily be good matches. Various implementations may use a threshold confidence score to determine if a good match has been found. If a good match has not been found, then a variety of options are available. For example, (i) the user may be prompted for more information, (ii) the search string may be modified automatically, if it has not already been, by, for example, using synonyms of recognized components, transposing components, etc., or (iii) the user may be presented with information on the size of the solution space for each component, and the confidence scores, which may reveal a component that the system had a difficult time recognizing.

Figure 15:
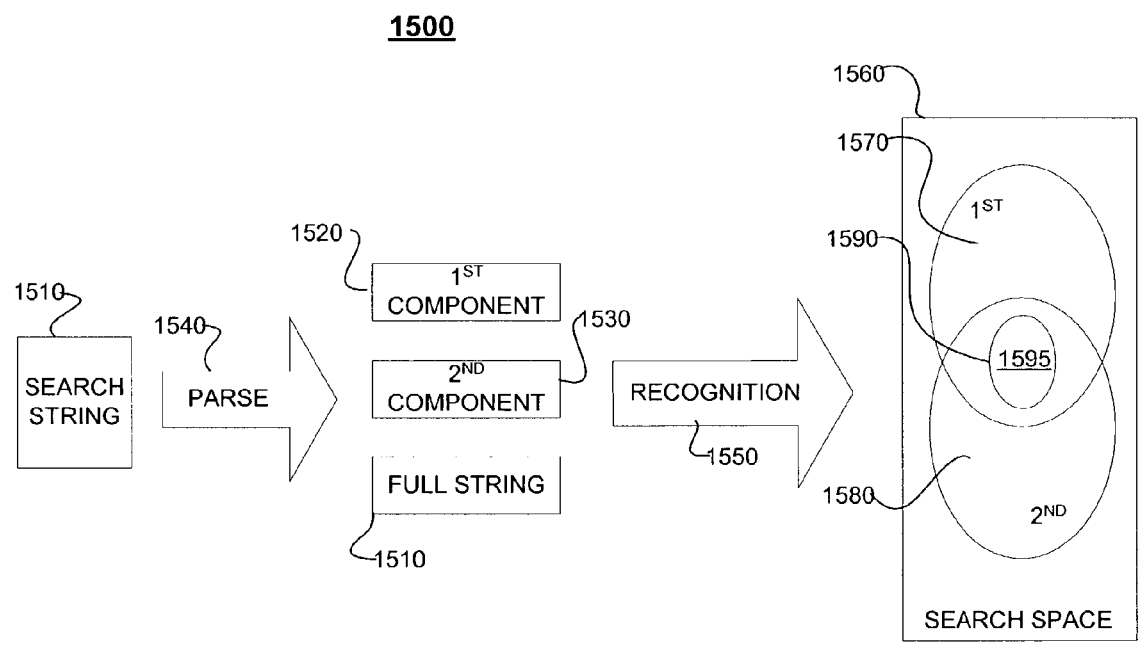
FIG. 15 is a diagrammatic flow chart depicting the process of FIG. 14.

Referring to FIG. 15, a diagrammatic flow chart 1500 depicting the process 1400 includes a search string 1510. The search string 1510 includes a first component 1520 and a second component 1530. The search string 1510 maybe, for example, a voice segment. The search string 1510 is parsed using a parse process 1540 into the first and second components 1520, 1530. A voice recognition process 1550 is performed on each component 1510, 1520, 1530, in parallel, using a search space 1560. The parse process 1540 and the voice recognition process 1550 may be implemented using, for example, a processor or other computing device or combination of devices.

Voice recognition of the first component 1520 results in a first solution space 1570. Assuming that voice recognition of the first component 1520 finishes before voice recognition of the second component 1530 and of the full string 1510, then each of the latter voice recognition operations can be restricted to the first solution space 1570.

Voice recognition of the second component 1530 results in a second solution space 1580. Assuming that voice recognition of the second component 1530 finishes before voice recognition of the full string 1510, then voice recognition of the full string 1510 can be restricted to an overlap 1590 of the first solution space 1570 and the second solution space 1580. Voice recognition of the full string 1510 results in a third solution space 1595.

The time required for performing voice recognition on a small component can be decreased by structuring the grammar so that common components of the database entries (which are included in the grammar) are compared with the components of the search string before other components of the database entries (which are also included in the grammar). Further, common components may be entered as separate vocabulary entries in a grammar, even though those components do not constitute complete database entries. For example, the word "Sony" may be entered into the vocabulary even though it does not refer to an individual product (database entry). The component "Sony" can then be associated with all of the grammar entries that include the word "Sony" and that correspond to complete database entries. The same can be done for the individual word "laptop," as well as the two-word component "Sony laptop," for example. Such a structure may allow for relatively quick recognition of the component "Sony laptop" and a corresponding narrowing of the search space for the recognition of the full search string "Sony laptop superslim 505Z."

Note that the list of matches determined in the process 1400 (1460) may return matches that correspond to actual database entries that match the entered search string. Accordingly, in such implementations, the voice recognition process may effectively perform the database search simultaneously. For example, each of the listed matches may serve as an index into the database for easy retrieval of the corresponding database entry.

Other implementations may allow search strings to include components that are not part of the database, however. For example, a user may be allowed to enter a price range for a computer. In such an example, the grammar could include, and be able to recognize, price ranges entered in a determined format. The grammar may be structured in a variety of ways to support recognizing such search strings. For example, if a user enters only a price range, the voice recognition engine may recognize the search string and associate it with a set of database entries satisfying the price range. Alternatively, the voice recognition engine may query the user for more data by, for example, returning a list of manufacturers having computers (computers being the assumed content of the database ultimately being searched) in that price range. If the user enters additional information, such as, for example, a manufacturer, the voice recognition system may use that additional information to narrow the solution space. If the user enters sufficient information, the grammar may be structured to allow the voice recognition system to determine, for the various price ranges that are recognizable, the grammar entries for all actual products (corresponding to actual database entries) that satisfy the entered price range and the other components of the search string. These entries may then be presented to the user.

The process 1400 can also be applied to systems that do not use voice input. For example, other modes of input may require a recognition process that could be performed in an analogous manner to that already described.

Figure 16:
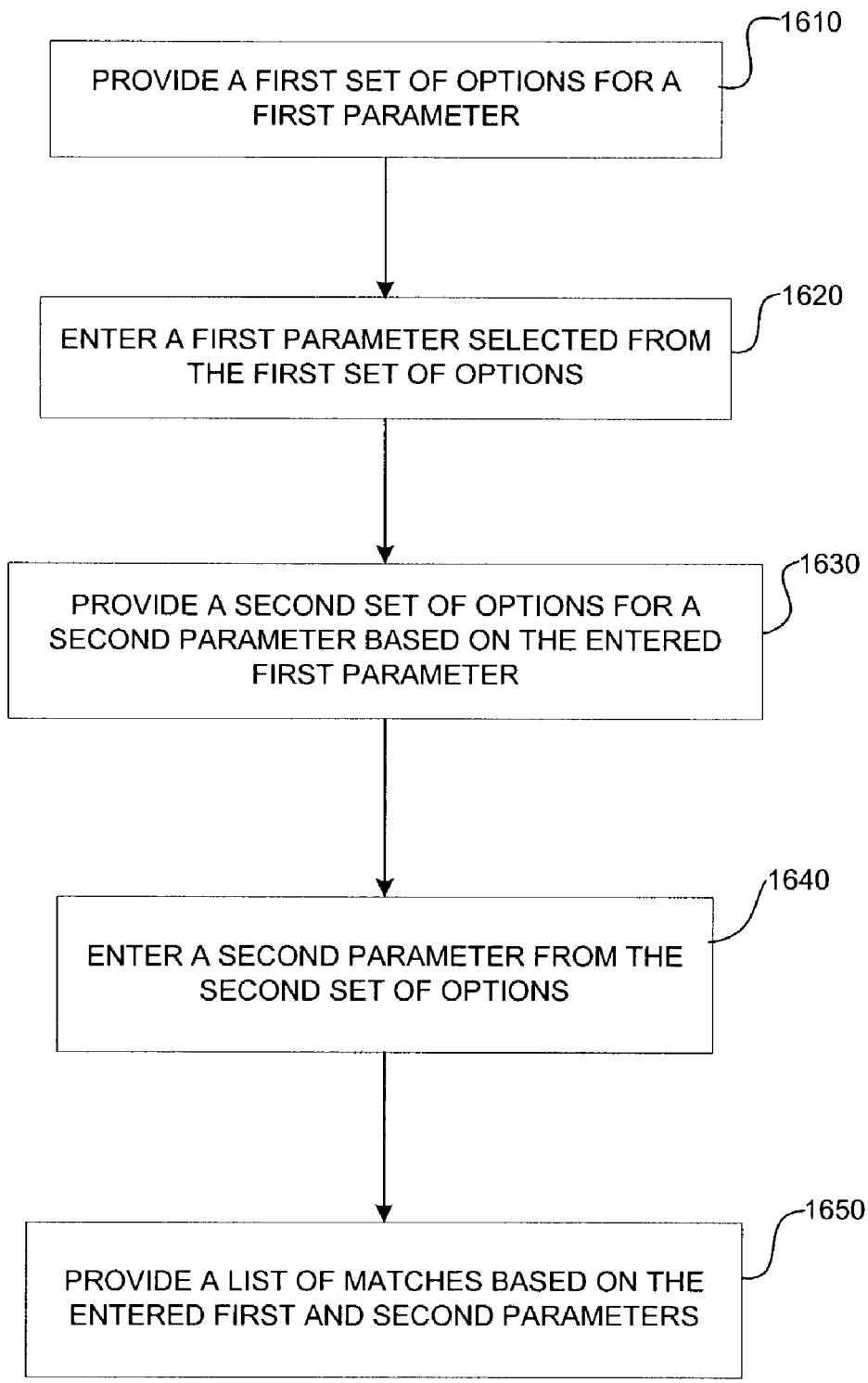
FIG. 16 is a flow chart of a process for performing a search for a search string using a multi-level, multi-parameter cascade approach.

Referring to FIG. 16, a process 1600 for performing a search for a search string using a multi-level, multi-parameter cascade approach includes providing a first set of options for a first parameter (1610). For example, a user interface to a database of computers may provide a list of manufacturers as the first set of options, with the first parameter being the manufacturer. The first set of options may be provided, for example, on a display, or through a voice response system.

The process 1600 includes entering a first parameter selected from the first set of options (1620). Continuing the example from above, a user may select, and enter, a manufacturer from a list provided in operation 1610. The user may enter the first parameter by using, for example, a stylus, keyboard, touch screen, or voice input.

The process 1600 includes providing a second set of options for a second parameter based on the first parameter (1630). Continuing the example from above, a user interface may provide a list of product types, including, for example, desktops, laptops, and palmtops, that are available from the manufacturer entered in operation 1620.

The process 1600 includes entering a second parameter selected from the second set of options (1640). Continuing the example from above, a user may select, and enter, a product type from the list provided in operation 1630.

The process 1600 includes providing a list of matches, based on the first and second parameters (1650). Continuing the example from above, the list of matches may include all computers in the database that are manufactured by the entered manufacturer and that are of the entered product type. For example, the list of matches may include all Sony laptops.

The process 1600 may be used, for example, instead of having a user enter a one-time, full search phrase. The process 1600 presents a set of structured searches or selections from, for example, drop-down lists. The first and second parameters can be considered to be parts of a search string, with the cumulative search string producing the list of matches provided in operation 1650. The database may be structured to allow for efficient searches based on the parameters provided in operations 1610 and 1630. Additionally, in voice input applications, by structuring the data entry, the grammar and vocabulary for each parameter may be simplified, thus potentially increasing recognition accuracy and speed.

Implementations may present multiple parameters and sets of options, and these may be organized into levels. In the process 1600, one parameter was used at each of two levels. However, for example, multiple parameters may be presented at a first level, with both entries determining the list of options presented for additional multiple parameters at a second level, and with all entries determining a list of matches. Such parameters may include, for example, manufacturer, brand, product type, price range, and a variety of features of the products in the product type. Examples of features for computers include processor speed, amount of random access memory, storage capacity of a hard disk, video card speed and memory, and service contract options.

Figure 17:
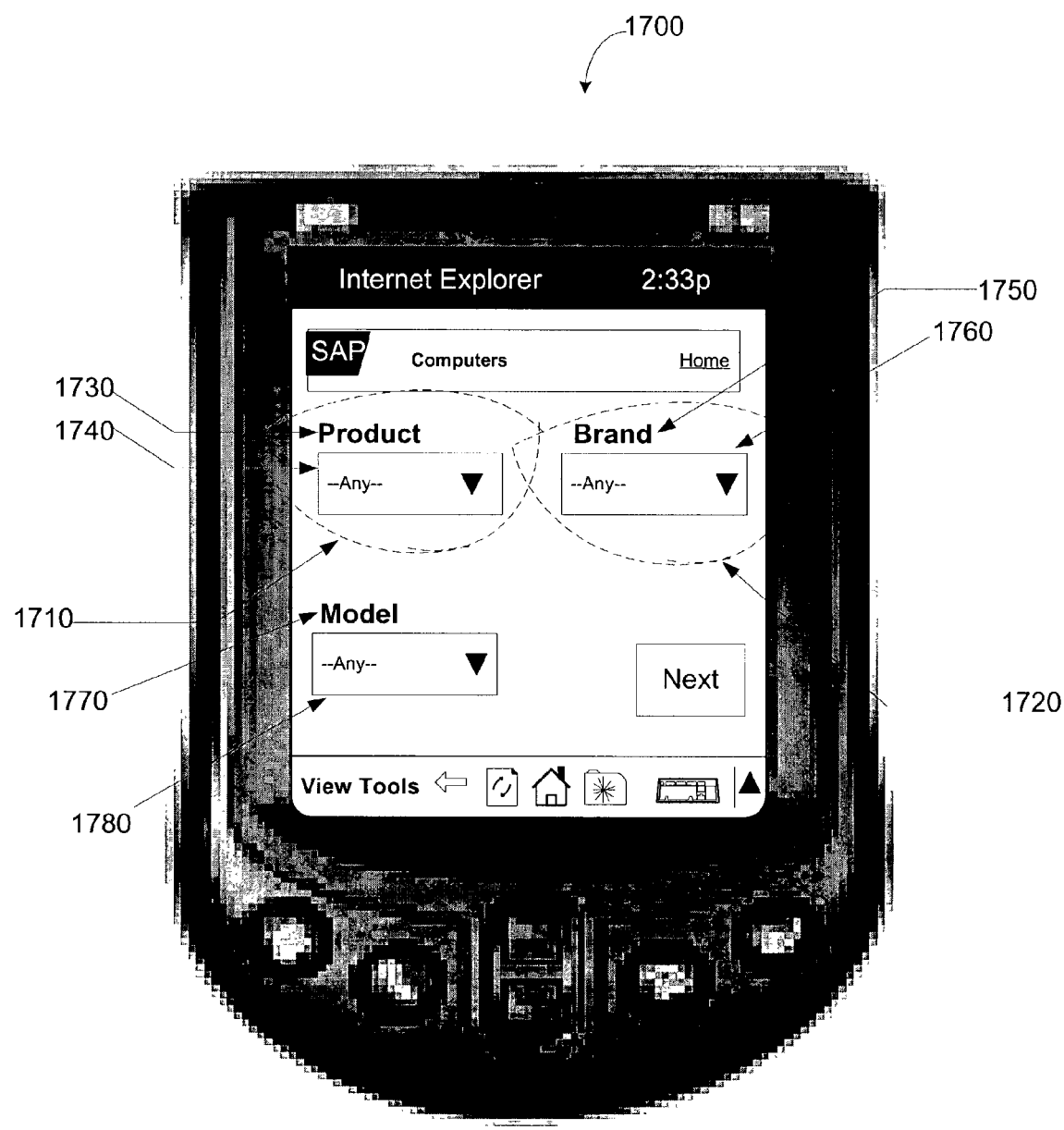
FIG. 17 is a picture of a page for implementing the process of FIG. 16.

Referring to FIG. 17, a picture of a page 1700 for implementing the process 1600 includes a first level 1710 and a second level 1720. The first level 1710 provides a first parameter 1730 for the product, with a corresponding pull-down menu 1740 that includes a set of options. The set of options in pull-down menu 1740 may include, for example, desktop, laptop, and palmtop. The second level 1720 provides a second parameter 1750 for the brand, with a corresponding pull-down menu 1760 that includes a set of options. The set of options in pull-down menu 1760 are all assumed to satisfy the product parameter entered by the user in pull-down menu 1740 and may include, for example, Sony, HP/Compaq, Dell, and IBM. Assuming that "laptop" was selected in the pull-down menu 1740, then the pull-down menu 1760 would only include brands (manufacturers) that sell laptops.

The page 1700 also includes a category 1770 for models that match the parameters entered in the first and second levels 1710 and 1720. The matching models are viewable using a pull-down menu 1780. As the page 1700 indicates, all of the search string information as well as the results may be presented in a single page. The page 1700 is also presentable in a single screen shot, but other single-page implementations may use, for example, a web page that spans multiple screen lengths and requires scrolling to view all of the information.

Figure 18:
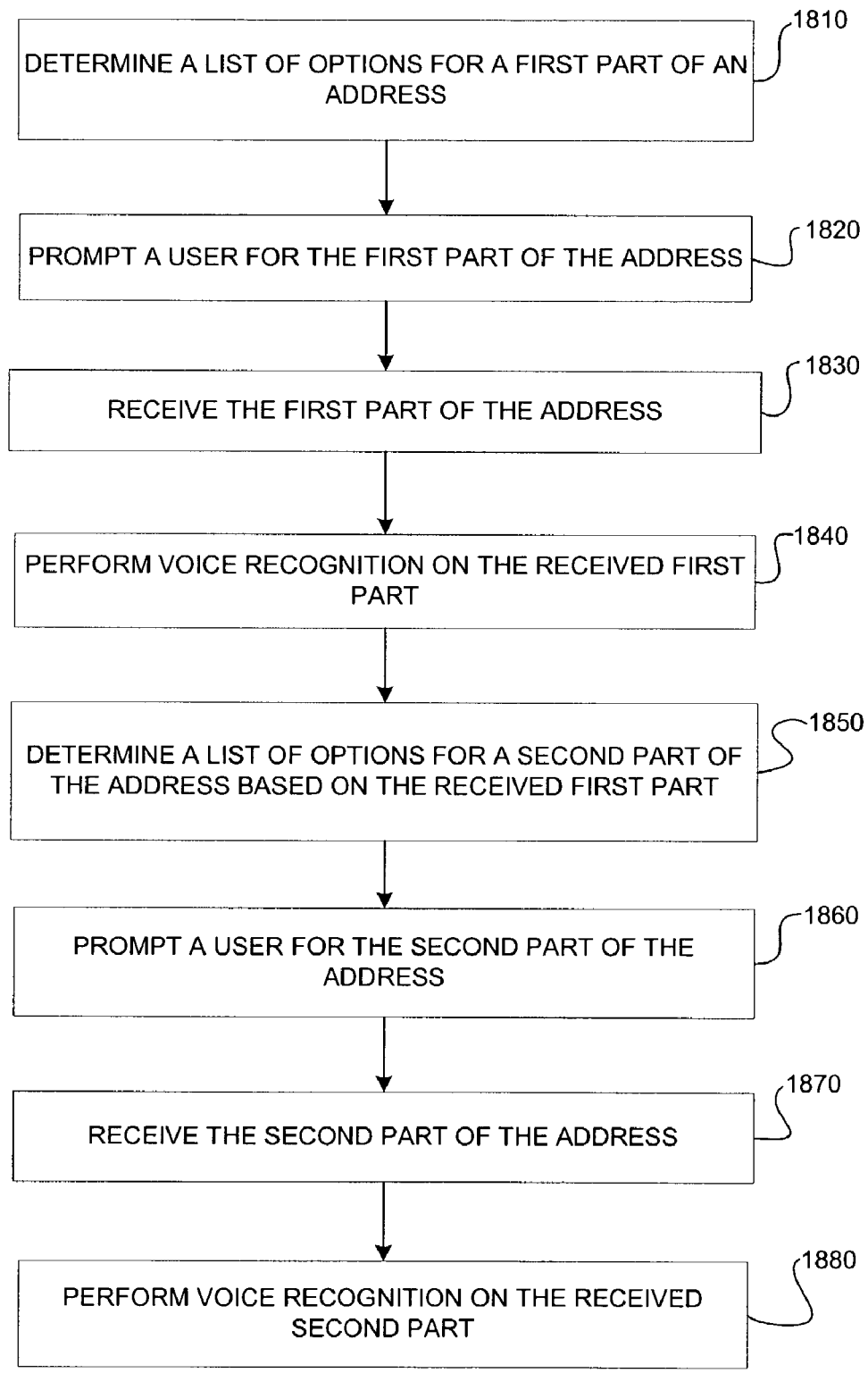
FIG. 18 is a flow chart of a process for recognizing an address.

Referring to FIG. 18, a process 1800 for recognizing an address includes determining a list of options for a first part of an address (1810). The address may be, for example, a street address or an Internet address, where Internet addresses include, for example, electronic mail addresses and web site addresses. If the address is a street address, the first part may be, for example, a state identifier.

The process 1800 includes prompting a user for the first part of the address (1820). The prompt may, for example, simply include a request to enter information, or it may include a list of options. The process 1800 includes receiving the first part of the address (1830). If the first part is received auditorily, the process 1800 includes performing voice recognition of the first part of the address (1840).

The process 1800 includes determining a list of options for a second part of the address based on the received first part (1850). Continuing the example from above, the second part may be, for example, a city identifier, and the list of options may include, for example, only those cities that are in the state identified by the received state identifier. By inverting the usual order of state and city in entering street addresses, a voice recognition system can simplify the relevant grammar and vocabulary for the city identifier, thus facilitating enhanced voice recognition accuracy and speed.

The process 1800 includes prompting the user for the second part of the address (1860). Again, the prompt need not include the list of options. The process 1800 includes receiving the second part of the address (1870). If the second part is received auditorily, the process 1800 includes performing voice recognition of the second part of the address (1880).

The process 1800 could continue with subsequent determinations of lists of options for further parts of the address. Continuing the example from above, a list of options for a zip code could be determined based on the city identified by the received city identifier. Such a list could be determined from the available zip codes in the identified city. City streets in the city or the zip code could also be determined. Further, country information could be obtained before obtaining state information.

As the above example and the process 1800 indicate, the range of possibilities for each subsequent piece of address information can be narrowed by entering the data in an order that is reverse from the ordinary practice, that is, by entering data for geographically broad categories to geographically narrow categories. If multiple countries are concerned, the impact of using the reverse order may be even greater because standard designations for streets vary for different languages.

The process 1800 may prompt the user in a number of ways. For example, the user may be prompted to enter address information in a particular order, allowing a system to process the address information as it is entered and to prepare the lists of options. Entry fields for country, state or province, city, zip or postal code, street, etc., for example, may be presented top-down on a screen or sequentially presented in speech output.

Figure 19:
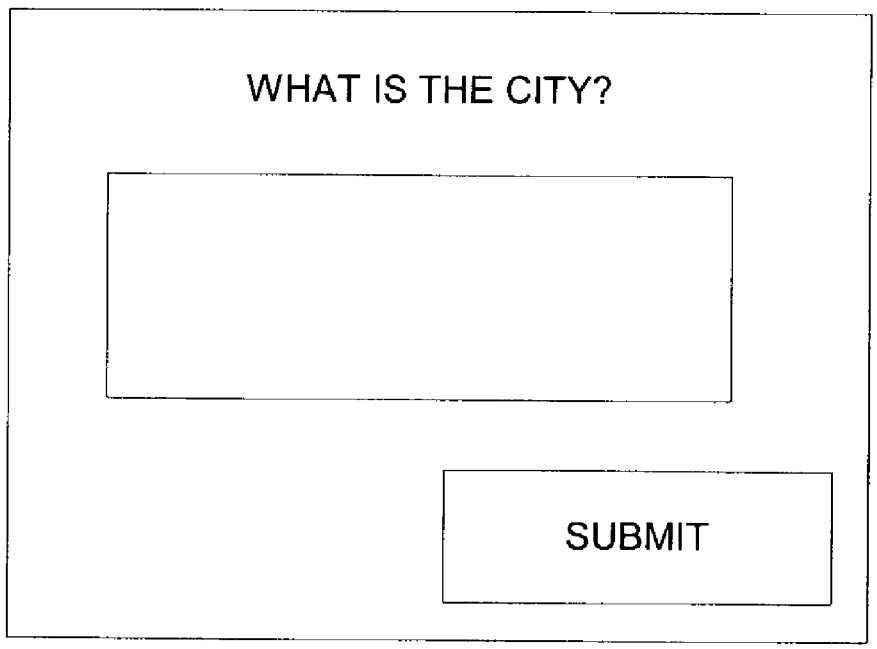
FIG. 19 is a block diagram of a pop-up wizard for entering address information.

Referring to FIG. 19, there is shown another way to prompt the user in the process 1800. A system may use a pop-up wizard 1900 on the screen of a device to ask the user to enter specific address information. Further, a system may preserve the normative order of address information, but use visual cues, for example, to prompt the user to enter the information in a particular order. Visual cues may include, for example, highlighting or coloring the border or the title of an entry field.

The process 1800 may be applied to data entered using a voice mode or another mode. After the data is entered at each prompt, and after it is recognized if voice input is used, a database of addresses may be searched to determine the list of options for the next address field. Such systems allow database searching on an ongoing basis instead of waiting until all address information is entered. Such systems also allow for guided entry using pull-down menus and, with or without guided entry, alerting a user at the time of entry if an invalid entry is made for a particular part of an address.

The process 1800 may also be applied to other addresses, in addition to street addresses or parts thereof. For example, the process 1800 may be applied to Internet addresses, including, for example, electronic mail addresses and web site addresses.

Figure 20:
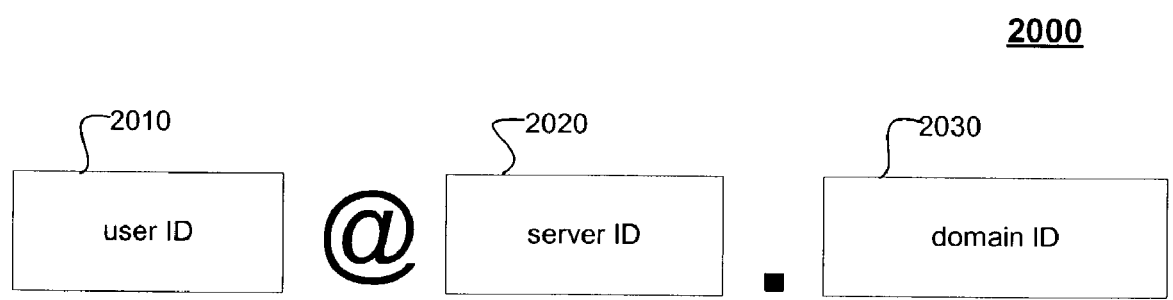
FIG. 20 is a block diagram of a format for entering an electronic mail address.

Referring to FIG. 20, a format 2000 for entering an electronic mail address includes using a user identifier 2010, a server identifier 2020, and a domain identifier 2030. The "at sign" separating the user identifier 2010 and the server identifier 2020, and the "dot" separating the server identifier 2020 and the domain identifier 2030 may be implicit and inserted automatically, that is, without human intervention.

In one implementation, the domain identifier 2030 is entered first due to the small number of options available for this field. A list of options for the server identifier 2020 can be generated based on the entered domain. For example, if "com" is entered for the domain, then a list of options for the server identifier 2020 may include, for example, all "Fortune 100" companies and the twenty-five most frequently visited commercial web sites. Similar lists may be generated for "gov," "net," and other domain identifiers 2030. A list of options for the user identifier 2010 may include, for example, common last names and first names and other conventions, such as, for example, a first initial followed by a last name.

Figure 21:
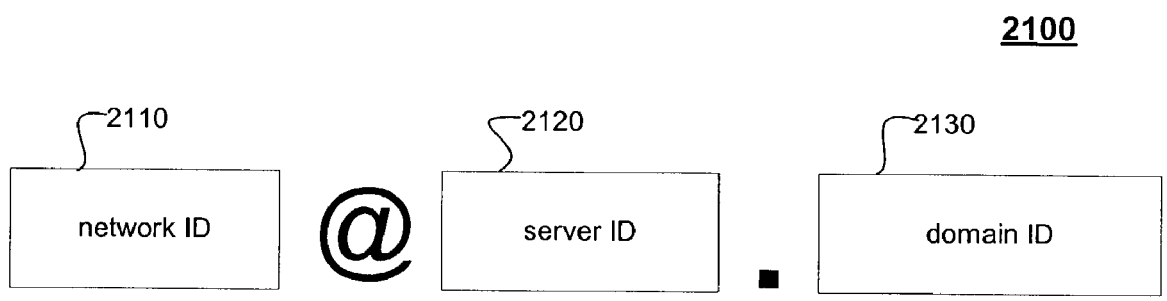
FIG. 21 is a block diagram of a format for entering a web site address.

Referring to FIG. 21, a format 2100 for entering a web site address includes using a network identifier 2110, a server identifier 2120, and a domain identifier 2130. The two "dots" separating the three identifiers 2110, 2120, 2130 may be implicit and inserted automatically. The network identifier may be selected from, for example, "www," "www1," "www2," etc.

Figure 22:
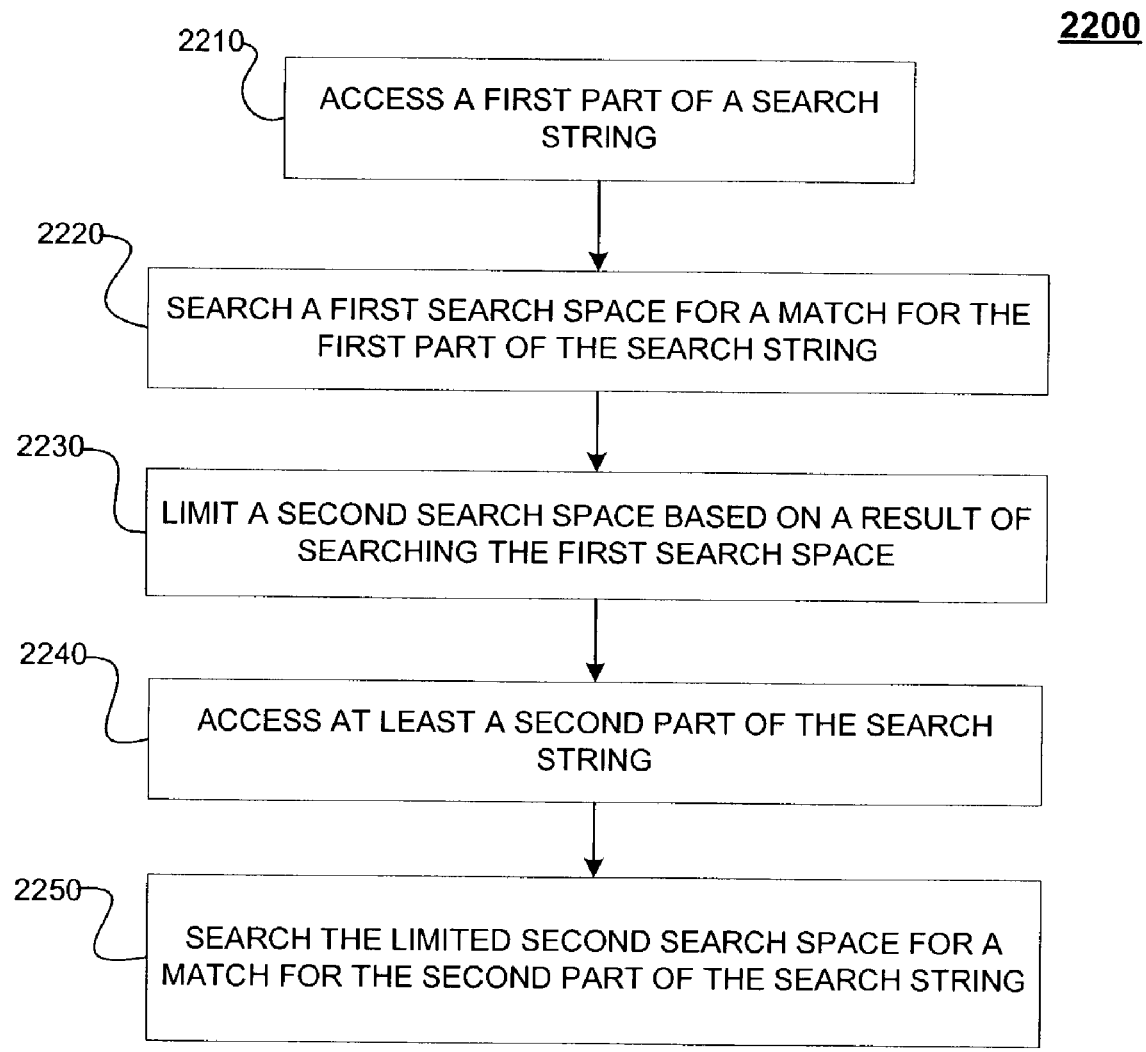
FIG. 22 is a flow chart of a process for searching for one or matches to a search string.

Referring to FIG. 22, a process 2200 for searching for one or matches to a search string includes accessing at least a first part of a search string (2210). Such accessing may include, for example, receiving a voice input, a stylus input, or a menu selection, and the first part may include the entire search string.

The process 2200 includes searching a first search space for a match for the first part of the search string (2220). The first search space may include, for example, a search space in a grammar of a voice recognition engine, a search space in a database, or a search space in a list of options presented to a user in a pull-down menu. Searching may include, for example, comparing text entries, voice waveforms, or codes representing entries in a codebook of vector-quantized waveforms.

The process 2200 includes limiting a second search space based on a result of searching the first search space (2230). The second search space may, for example, be similar to or the same as the first search space. Limiting may include, for example, paring down the possible grammar or vocabulary entries that could be examined, paring down the possible database entries that could be examined, or paring down the number of options that could be displayed or made available for a parameter of the search string. And paring down the possibilities or options may be done, for example, so as to exclude possibilities or options that do not satisfy the first part of the search string.

The process 2200 includes accessing at least a second part of the search string (2240) and searching the limited second search space for a match for the second part of the search string (2250). Accessing the second part of the search string may include, for example, receiving a voice input, a stylus input, or a menu selection, and the second part may include the entire search string. Searching the limited second search space may be performed, for example, in the same way or in a similar way as searching the first search space is performed. As suggested by the discussion of this paragraph and the preceding paragraphs, the process 2200 is intended to cover all of the disclosed processes.

Figure 23:
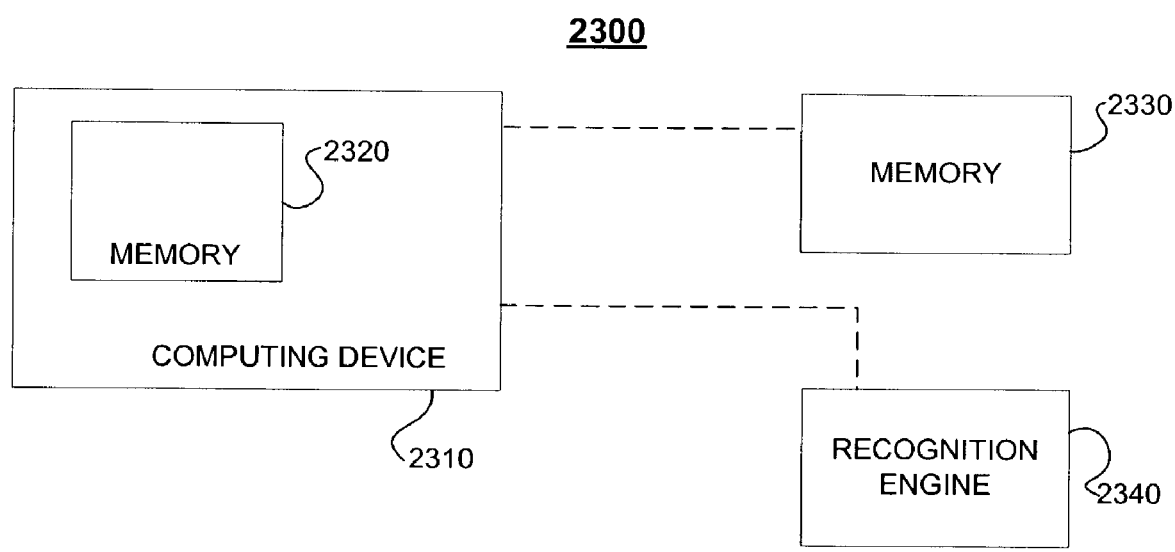
FIG. 23 is a block diagram of a system for performing one or more of the described processes.

Referring to FIG. 23, a system 2300 for implementing one or more of the above processes includes a computing device 2310, a first memory 2320 located internal to the computing device 2310, a second memory 2330 located external to the computing device 2310, and a recognition engine 2340 located external to the computing device 2310. The computing device may be, for example, a desktop, laptop, palmtop, or other type of electronic device capable of performing one or more of the processes described. The first and second memories 2320, 2330 may be, for example, permanent or temporary memory capable of storing data or instructions at least temporarily. The recognition engine 2340 may be a voice recognition engine or a recognition engine for another mode of input. The second memory 2330 and the recognition engine 2340 are shown as being external to, and optionally connected to, the computing device 2310. However, the second memory 2330 and the recognition engine 2340 may also be integrated into the computing device 2310 or be omitted from the system 2300.

Various modifications of the above implementations may be made. For example, the operations of the disclosed processes need not necessarily be performed in the order(s) indicated.

Section III

In the above description, numerous examples have been given which allow a first-modality gateway and a second-modality gateway to be synchronized, so that a user may access a server system using either or both of the gateways at a given point in time to obtain a given piece of information or perform a specific action. FIGS. 1, 7, and 10 depict several examples, and other examples have been described.

One action which a user might perform when utilizing the gateway synchronization capabilities of such systems is the selection of a web page that is linked to a currently-viewed web page, where this selection can be performed, for example, either by voice input using a VXML page, or by clicking on an HTML link embedded in an HTML page, using, for example, a stylus or mouse.

Another action which a user might perform is to enter text into, for example, multiple fields within a form on a single web page. For example, as discussed above, variations of processes 300–600 in FIGS. 3–6 include techniques for implementing commands relating to a particular page. More specifically, in FIGS. 8 and 9, variations of operations 810 and 910 allow the synchronization controller 720 of FIG. 7 to receive inputs such as browser inputs and voice inputs, where the inputs may include a data input and/or a focus request for moving to a new field. In an example given above with respect to operation 910, the voice mode system 740 receives a user's city selection for a field in a VXML page, and then subsequently moves a focus to a field for state selection.

Text can be entered using either manual entry by, for example, keyboard, or via a voice-recognition system associated with a corresponding and synchronized VXML page. The discussion of FIGS. 19–21 describe examples of such text entry; more specifically, these figures and related text and examples describe techniques whereby, for example, a grammar is selectively narrowed when performing voice-recognition on a search string, or where a grammar is progressively narrowed as a plurality of related entries are input. By these and other techniques, text entry using voice recognition may be improved in terms of speed and accuracy.

Another technique, allowed for in the discussion above, for entering text or other information into multiple fields within a form is to have a two-level, hierarchical dynamic grammar. In this technique, there are multiple levels and instances of independent, discrete grammars, rather than multiple subsets of a larger and/or interdependent grammar(s).

Figure 24:
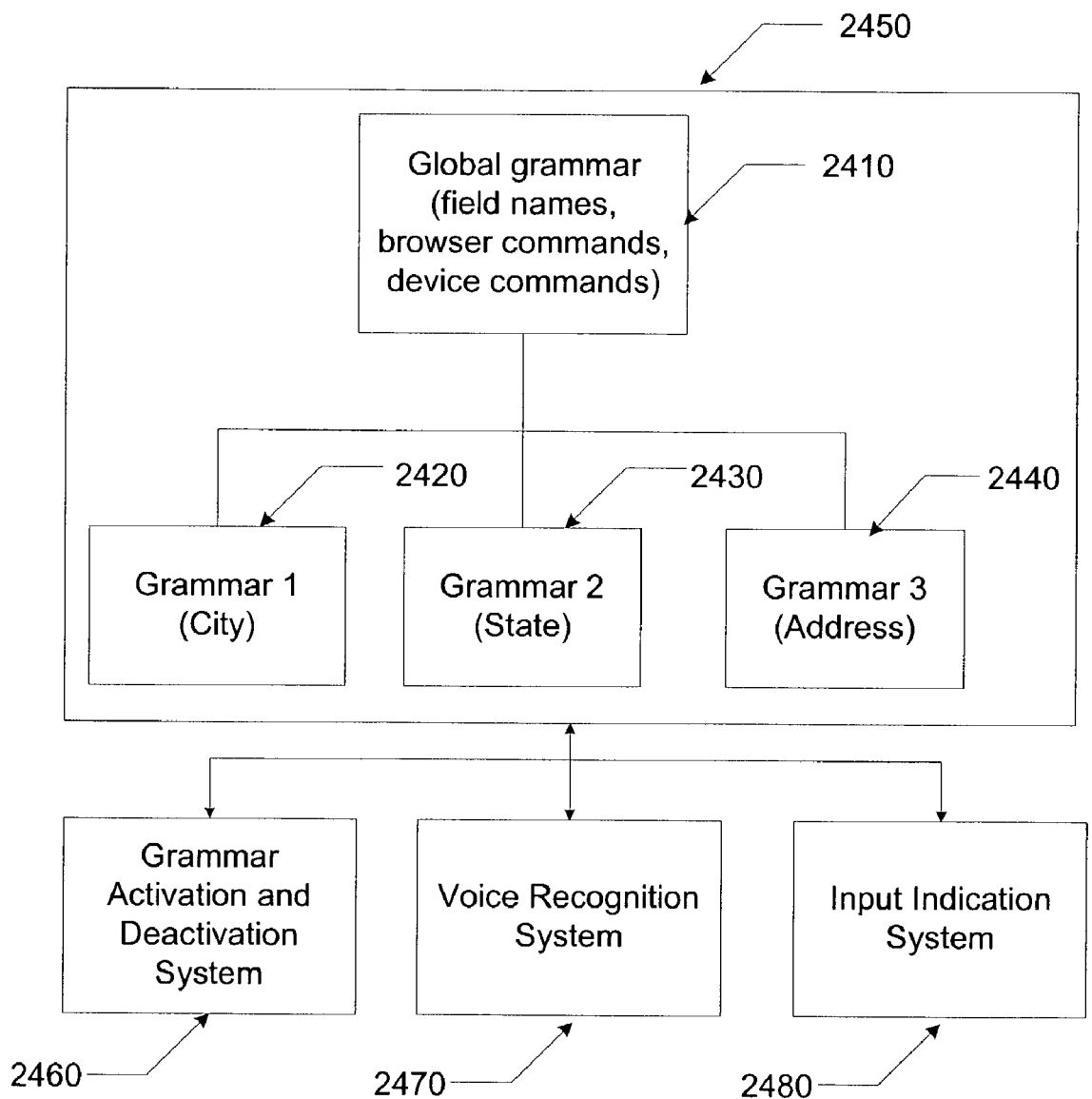
FIG. 24 is a block diagram of a structure for implementing a two-level, dynamic grammar.

FIG. 24 is a block diagram of a structure for implementing a two-level, dynamic grammar. In FIG. 24, a first level includes a global grammar 2410. Global grammar 2410 includes vocabulary for voice commands that are recognized by an operating device or software regardless of a current state of a system or a page. For example, even when a user is currently entering pieces of text information into one of a plurality of fields on a page, the global grammar will be continuously operable to recognize voice input references for, for example, names of other fields on the page, commands for activating the browser (such as, for example, "back," "home," or "refresh"), and device commands such as "restart."

In FIG. 24, a second level includes a plurality of specific grammars. For example, the second level might include a first grammar 2420 for recognizing voice commands inputting a city name, a second grammar 2430 for recognizing voice commands for inputting a state name, and a third grammar 2440 for recognizing voice commands for inputting a street address.

In FIG. 24, it should be understood that grammars 2410–2440 are separate, discrete, independent grammars. One consequence of having independent grammars is that a given word may be replicated in multiple grammars, thereby increasing total storage requirements. For example, grammar 2420 might include the word "Washington" for identifying a name of the city, Washington, DC. Grammar 2430 might also include the word "Washington," here to identify the state of Washington. Finally, grammar 2440 might include the word "Washington" in case a user lives on "Washington Street."

In contrast, other voice recognition systems may have a single, large grammar (or a plurality of dependent grammars), in which the word "Washington" is stored once and entered into whatever field is currently active upon detection of the word "Washington." Moreover, such systems may be relatively poor in recognizing voice input when there are multiple fields for voice recognition that are active at the same time. For example, the fields of last name and first name may both exist in a form on a software application and may be concurrently active to display a result of recognizing a voice input such as "Davis" (which may be, for example, a valid selection within both a "first name" and a "second name" field). Such fields with similar data in the recognition grammar may compete for the results of voice recognition, and therefore increase the probability of inaccuracy.

The multi-level grammar of FIG. 24 may thus provide increased speed and/or accuracy of voice recognition. This speed and/or accuracy improvement results, for example, from the fact that only one from among the second level of grammars is active a particular time. Therefore, the size of the vocabulary that must be searched by a voice-recognition system may be severely reduced. With a smaller vocabulary, recognition accuracy generally increases, and processing time generally decreases.

Moreover, the voice recognition system is constantly aware of which grammar (field) is active, and so does not need to disambiguate a recognized word with respect to a given field. For example, in other systems in which the word Washington is recognized, the systems may have to determine the field into which the recognized word should be inserted, for example, city, state, or address. In using the multi-level, dynamic grammar of FIG. 24, such additional step(s) may be avoided.

Together, the various grammars 2410, 2420, 2430, and 2440 may be stored within a storage area 2450. The storage area 2450 may represent a single database or medium, or multiple databases (media). The grammars may be stored in, for example, a single file or in a plurality of files.

A grammar activation and deactivation system 2460 is available to turn on one of the second-level grammars 2420, 2430, or 2440, as needed, and to concurrently ensure that the other two are deactivated. A voice recognition system 2470 interacts with a user to input voice or spoken data and matches the voice or spoken data with words or other portions of the currently-active grammar. Also, an input indication system 2480 demonstrates to the user which grammar is active, as well as a result of the matching operation performed by the voice recognition system 2470.

It should be understood that the storage area 2450, grammar activation and deactivation system 2460, the voice recognition system 2470, and the input indication system 2480 may be implemented on a single device, or on a plurality of devices. For example, one or more of the elements of FIG. 24 may be located on a server system, and/or on a local system such as a mobile computing device. For example, the input indication system 2480 may be a field(s) within a form on a graphical user interface such as a web page, as discussed above, so that voice data input by the user and recognized by the voice recognition system 2470 can be displayed to the user. The input indication system 2480 may also be a recorded or computer-generated voice repeating a recognized word to the user, such as might be used in a telephone entry system.

Figure 25:
FIG. 25 is a web page for entering information about a user.

FIG. 25 shows a web page 2500, being viewed on a portable device, for entering information about a user. In FIG. 25, page 2500 may be a VXML page including a first name field 2510, a last name field 2520, a state field 2530, a zip code field 2540, a city field 2550, and a street address field 2560. Page 2500 also illustrates a plurality of buttons 2570, which are intended to illustrate a plurality of conventional web commands, such as "refresh," "home," "favorites folder," and so on.

Thus, according to the description above, a user may activate the first name field 2510 using a variety of techniques. For example, field 2510 could be selected by a voice command recognized by the first level grammar that includes global grammar 2410. Alternatively, if page 2500 is synchronized with an HTML (and/or JSP) page as described above, the field could be selected using a stylus, mouse, or other mechanical input. As another example, the field could be automatically highlighted, due to being the first field in the form.

In any case, once the field 2510 is highlighted, a second-level grammar corresponding to that field is activated, and only words from that grammar will be recognized for entry into field 2510. In this way, a voice-recognition system 2470 will have a significantly restricted vocabulary from which to choose a first name, so that the speed and/or accuracy with which the first name is selected may be greatly improved.

Figure 26:
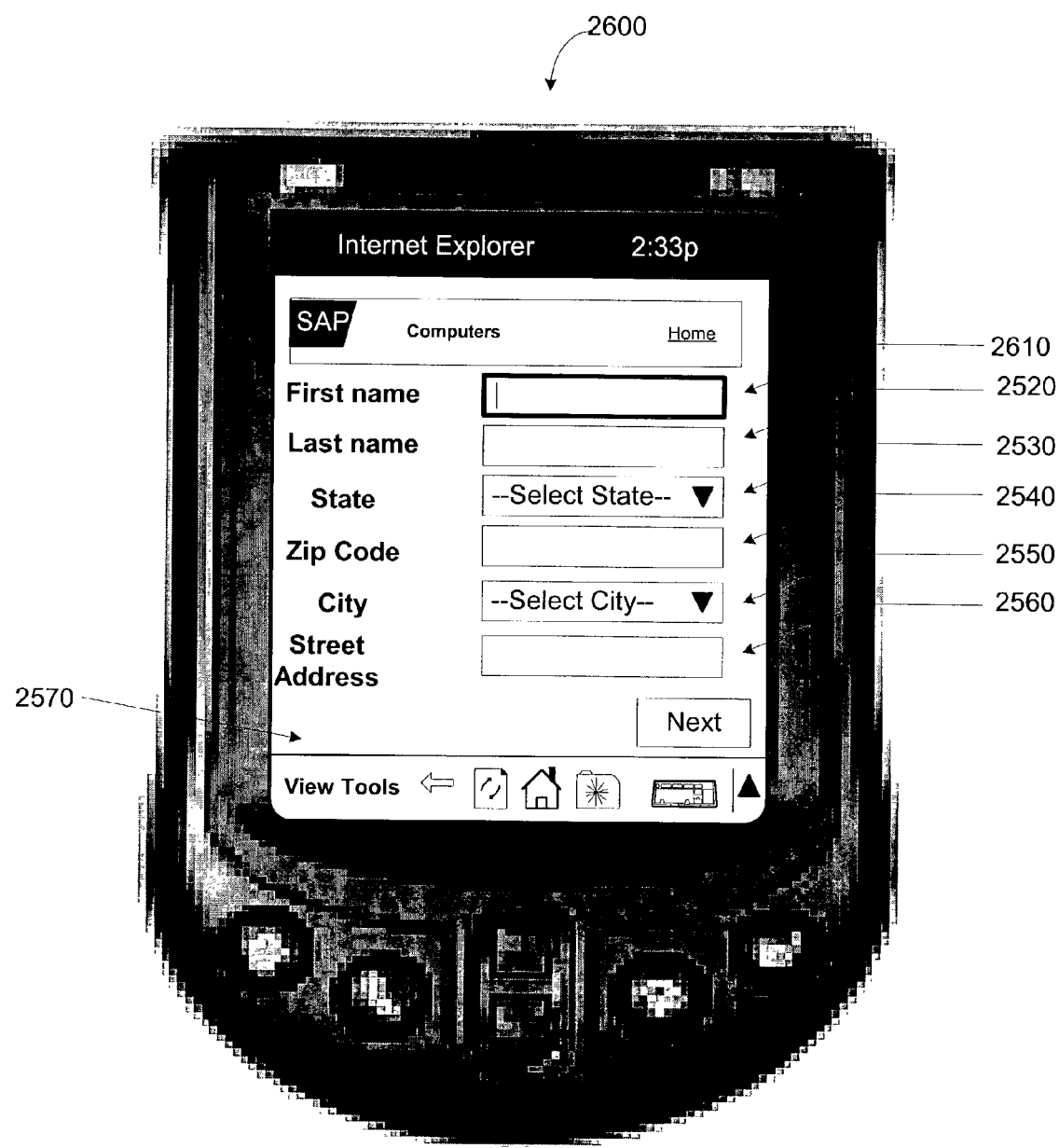
FIG. 26 is a web page for entering information about a user.

FIG. 26 shows a web page 2600, again being viewed on a portable device, for entering information about a user. Page 2600 has essentially the same fields as page 2500, however, page 2600 illustrates a visual cue highlighting a first name field 2610. The visual cue serves as a technique for indicating to the user which grammar is currently active. Various examples of such visual cues may include a cursor within the field, a highlighting of the field, a specific coloration of the field, or any other technique for indicating that the particular field and its associated grammar is active.

In one implementation, field 2610 is automatically highlighted as the first field on the page 2600. Upon filling in a first name into field 2610, the visual cue may automatically move to the field 2520, and so on through the page 2600. As shown, an entry into the various fields may be aided by pull-down menu(s), such as in fields 2530 and 2550, or may be filled without the aid of pull-down menus(s), such as in fields 2510 (2610), 2520, 2540, and 2560.

Due to the presence of first level grammars such as global grammar 2410, which remains active even when a particular one of the second level grammars is activated, the user may alternatively choose fields individually, simply by providing an activation signal for a selected one of the (currently) deactivated grammars. For example, the activation signal may involve simply saying the name of the desired field associated with the grammar to be activated. Moreover, as already noted, multi-modal synchronization of pages 2500/2600 allows the user to utilize an activation signal involving a physical selection of a field (for example, using a physical tool such as a stylus or a mouse), even when the pages include, or are associated with, VXML pages/data.

Alternatively, the global grammar 2410 may be included within each of the independent grammars 2420, 2430, and 2440, particularly in the case where the global grammar 2410 is relatively small in size. In this example, total memory requirements will likely be increased; however, the need to have two processes running simultaneously (that is, two grammars) would be eliminated.

It should be understood that the implementations of FIGS. 24–26 are particularly advantageous with respect to mobile computing devices, in which computing/processing resources are at a relative premium. Moreover, often in small mobile computing devices, text entry is awkward, difficult, or non-existent, so that speedy, accurate voice entry, particularly into forms such as web pages, would be very useful and advantageous.

Although the above implementations of a dynamic grammar have been discussed with respect to a web page such as HTML, VXML, or JSP, they are in fact compatible with many or all of the various implementations discussed above in Sections I and II. Moreover, the implementations may be compatible with non-web or non-Internet related implementations. For example, the multi-level, dynamic grammar of FIG. 24 could be used in almost any software application in which discrete data should be entered.

In fact, any application in which data is to be entered and vocal entry is possible could benefit from the above-described implementations. For example, as referred to above, telephone-based information entry could be facilitated in which a recorded or computerized voice speaks a field as a prompt for data entry, such as first name, and then selects from an independent, discrete grammar associated with the field, as described above.

Moreover, although a two-level grammar has been described above, implementations may also include a three (or more) level grammar. For example, a web page having two frames may have a set of independent grammars for each frame, a global grammar for each frame, and a global grammar for the web browser or other application(s) (such as an operating system for the device running the web browser).

The implementations described may be implemented, wholly or partially, in hardware or in software. Circuitry or an apparatus may be associated with a storage medium having instructions stored thereon, and the circuitry, apparatus, and/or storage medium may be associated with a processor or processors operable to implement the instructions.

A number of implementations have been described. Nevertheless, it will be understood that various modifications may be made. For example, the described examples may be combined or modified in various ways not discussed. Accordingly, other implementations are within the scope of the following claims.

What is claimed is:

1. A method comprising:
   activating a first grammar from among a plurality of independent grammars, the first grammar being identified with a first input category;
   deactivating at least a second grammar from among the plurality of independent grammars;
   inputting spoken data related to the first input category;
   matching the spoken data to stored data within the first grammer; and
   synchronizing a first-modality gateway and a second modality gateway, both gateways interfacing between a user and a server system, the synchronizing allowing either of the first-modality gateway or the second-modality gateway, at a given point in time, to interface with specific information in the server system,
   wherein the specific information is a field identification command for identifying a first field within a form on a graphical user interface, the first field associated with the first input category.

2. The method of claim 1 in which the plurality of independent grammars define a first level of grammar that includes the first grammar and the second grammar, and wherein activating the first grammar comprises activating a second level of grammar that is independent from the plurality of independent grammars.

3. The method of claim 1 in which the plurality of independent grammars define a first level of grammar that includes the first grammar and the second grammar, and wherein deactivating the second grammar comprises deactivating all of the first-level grammars aside from the first grammar.

4. The method of claim 1 wherein the specific information is the stored data.

5. The method of claim 1 wherein synchronizing the first-modality gateway and the second-modality gateway comprises synchronizing a browser and a voice gateway, wherein the server system includes web pages.

6. The method of claim 5 wherein activating the first grammar is in response to the identifying the first field within the form.

7. The method of claim 1 wherein each of the plurality of independent grammars is stored separately.

8. The method of claim 1 wherein activating a first grammar comprises indicating to a user that the first grammar has been activated.

9. The method of claim 8 wherein indicating to the user comprises displaying a visual cue identifying a first field within a graphical user interface, the first field being associated with the first input category.

10. The method of claim 9 wherein the visual cue is automatically advanced to a second field upon the matching of the spoken data to the stored data within the first grammar.

11. The method of claim 9 wherein the visual cue is advanced to a second field, after the matching of the spoken data to the stored data within the first grammar, by inputting a field advancement voice command, wherein the field advancement voice command is matched against a global grammar that is active at a same time as with the first grammar.

12. The method of claim 9 wherein the graphical user interface comprises a web page.

13. The method of claim 8 wherein indicating to the user comprises aurally identifying the first input category to the user.

14. The method of claim 1 further comprising:
deactivating the first grammar;
activating the second grammar, the second grammar being identified with a second input category;
inputting secondary spoken data related to the second input category; and matching the secondary spoken data to secondary stored data within the second grammar.

15. The method of claim 1, further comprising:
activating a global grammar such that the first grammar and the global grammar are both active for a period of time;
inputting global spoken data that identifies a second input category from among a plurality of input categories;
matching the global spoken data to a portion of the global grammar; and
activating, in response to the matching of the global spoken data, the second grammar, the second grammar being identified with the second input category.

16. An apparatus comprising a storage medium having instructions stored thereon, the instructions including:
a first code segment for activating a first grammar associated with a first category;
a second code segment for activating a first data entry mechanism associated with the first category;
a third code segment for receiving first voice data;
a fourth codes segment for selecting a portion of the first grammar corresponding to the first voice data for input into the first data entry mechanism;
a fifth code segment for deactivating the first grammar;
a sixth code segment for activating a second grammar associated with a second category;
a seventh code segment for activating a second data entry mechanism associated with the second category;
an eighth code segment for receiving second voice data;
a ninth code segment for selecting a portion of the second grammar corresponding to the second voice data for input into the second data entry mechanism; and
a tenth code segment for synchronizing a first-modality gateway and a second modality gateway, both gateways interfacing between a user and a server system, the synchronizing allowing either of the first-modality gateway or the second-modality gateway, at a given point in time, to interface with specific information in the server system.
wherein the specific information is a field identification command for identifying a first field within a form on a graphical user interface, the first field associated with the first input category.

17. The method of claim 16 wherein the first data entry mechanism comprises a field in the graphical user interface.

18. The method of claim 17 wherein the second code segment is additionally for visually indicating the field.

19. The method of claim 17 wherein the graphical user interface comprises a web page.

20. The method of claim 16 wherein the first data entry mechanism comprises an audio recording.

21. The method of claim 16 wherein the sixth code segment is additionally for automatically activating the second grammar in response to the deactivating of the first grammar.

22. The method of claim 16 wherein the sixth code segment is additionally for inputting a second-grammar activation signal from the user.

23. The method of claim 22 wherein the second-grammar activation signal activates the second data entry mechanism associated with the second category for data entry.

24. The method of claim 22 wherein the second-grammar activation signal comprises third voice data.

25. The method of claim 24 further comprising an eleventh code segment for matching the third voice data against a portion of a third grammar, wherein the third grammar remains active regardless of whether the first grammar or the second grammar are activated.

26. The method of claim 24 wherein the second-grammar activation signal comprises a physical input.

27. A system comprising:
a first storage area operable to store a first grammar;
a second storage area operable to store a second grammar, the second grammar being independent from the first grammar;
a grammar activation and deactivation system operable to activate the first grammar and ensure that the second grammar is simultaneously inactive;
a voice-recognition system operable to input spoken data and match the spoken data against a corresponding portion of the first grammar;
an input indication system operable to indicate the corresponding portion of the first grammar to a user; and
a synchronization system operable to synchronize a first-modality gateway and a second modality gateway, both gateways interfacing between the user and a server system, the synchronization allows either of the first-modality gateway or the second-modality gateway, at a given point in time, to interface with specific information in the server system,
wherein the specific information is a field identification command for identifying a first field within a form on a graphical user interface, the first field associated with the first input category.

28. The system of claim 27, further comprising a third storage area operable to store a third grammar, the third grammar being independent from the first grammar and the second grammar and being operable to be activated by the activation and deactivation system so that the third grammar and the first grammar are both active for a period of time.

29. The system of claim 27, wherein the input indication system comprises a field within the graphical user interface operable to display the corresponding portion of the first grammar.

30. The system of claim 27 wherein the grammar activation and deactivation system is further operable to output a grammar identifier to the user that identifies which of the first grammar and second grammar is currently active.

31. The system of claim 30 wherein the grammar identifier comprises a visual cue identifying a first field or a second field within a graphical user interface, the first field and the second field being associated with the first grammar and the second grammar, respectively.

* * * * *